US012574562B2

(12) United States Patent
Yin et al.

(10) Patent No.: US 12,574,562 B2
(45) Date of Patent: Mar. 10, 2026

(54) BILATERAL FILTER IN VIDEO CODING

(71) Applicants: Beijing Bytedance Network Technology Co., Ltd., Beijing (CN); Bytedance Inc., Los Angeles, CA (US)

(72) Inventors: Wenbin Yin, Beijing (CN); Kai Zhang, San Diego, CA (US); Li Zhang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 13 days.

(21) Appl. No.: 18/395,524

(22) Filed: Dec. 23, 2023

(65) Prior Publication Data

US 2024/0137573 A1    Apr. 25, 2024

Related U.S. Application Data

(63) Continuation of application No. PCT/CN2022/100973, filed on Jun. 24, 2022.

(30) Foreign Application Priority Data

Jun. 25, 2021    (WO) ................ PCT/CN2021/102281

(51) Int. Cl.
*H04N 19/80*        (2014.01)
*H04N 19/82*        (2014.01)
*H04N 19/86*        (2014.01)

(52) U.S. Cl.
CPC .................................... *H04N 19/80* (2014.11)

(58) Field of Classification Search
CPC ........ H04N 19/80; H04N 19/82; H04N 19/86; H04N 19/117
See application file for complete search history.

(56) References Cited

U.S. PATENT DOCUMENTS

| | | | | |
|---|---|---|---|---|
| 8,542,751 B2 * | 9/2013 | Ahuja | ................... | H04N 19/117 |
| | | | | 375/240.03 |
| 11,153,563 B2 * | 10/2021 | Rusanovskyy | ...... | H04N 19/176 |
| 11,343,504 B2 * | 5/2022 | Zhao | .................... | H04N 19/597 |
| 12,219,133 B2 * | 2/2025 | Ström | .................. | H04N 19/157 |

(Continued)

FOREIGN PATENT DOCUMENTS

| | | |
|---|---|---|
| CN | 107925772 A | 4/2018 |
| CN | 109691102 A | 4/2019 |

(Continued)

OTHER PUBLICATIONS

NPL_Search—Innovation Q+ IP.com log—2025; (Year: 2025).*

(Continued)

*Primary Examiner* — Luis Perez-Fuentes
(74) *Attorney, Agent, or Firm* — Conley Rose, P.C.

(57) ABSTRACT

A mechanism for processing video data is disclosed. The mechanism determines to apply a bilateral filter to samples in a current block of a current picture. The bilateral filter includes filter weights that vary based on a distance between surrounding samples and a central sample and differences in intensities of the surrounding samples and the central sample. A conversion is performed between a visual media data and a bitstream based on the bilateral filter.

19 Claims, 13 Drawing Sheets

(56) References Cited

U.S. PATENT DOCUMENTS

| | | | |
|---|---|---|---|
| 2014/0086333 A1 | 3/2014 | Wang |
| 2018/0063527 A1 | 3/2018 | Chen |
| 2018/0176604 A1 | 6/2018 | Chesnokov |
| 2018/0184127 A1 | 6/2018 | Zhang |
| 2020/0128243 A1 | 4/2020 | Wang |
| 2020/0296364 A1 | 9/2020 | Rusanovskyy |
| 2022/0303564 A1 | 9/2022 | Teo |
| 2022/0400292 A1 | 12/2022 | Kotra |
| 2024/0137573 A1 | 4/2024 | Yin |
| 2024/0187580 A1 | 6/2024 | Yin |

FOREIGN PATENT DOCUMENTS

| | | | |
|---|---|---|---|
| CN | 109964482 A | 7/2019 |
| CN | 110622514 A | 12/2019 |
| CN | 110706160 A | 1/2020 |
| CN | 111108748 A | 5/2020 |
| CN | 111937403 A | 11/2020 |
| CN | 112514382 A | 3/2021 |
| WO | 2018067051 A1 | 4/2018 |
| WO | 2018180841 A1 | 10/2018 |
| WO | 2021061814 A1 | 4/2021 |

OTHER PUBLICATIONS

Guided image filtering; He—2012; (Year: 2012).*

Sample adaptive offset in the HEVC standard; Fu—2012; (Year: 2012).*

Using original samples for SAO and ALF optimization; Hu—Apr. 2021; (Year: 2021).*

Alshina E., et al., "Description of Exploration Experiments on Coding Tools," Joint Video Exploration Team (JVET) of ITU-T SG 16 WP 3 and ISO/IEC JTC 1/SC 29/WG 11, 5th Meeting: Geneva, CH, Jan. 12-20, 2017, Document: JVET-E1011, 08 Pages, XP030150651.

Document: JVET-V0104-v3, Yin, W., et al., "EE2-related: TU-level adaptive self-guided filter," Joint Video Experts Team (JVET) of ITU-T SG 16 WP 3 and ISO/IEC JTC 1/SC 29/WG 11 22nd Meeting: Teleconference Apr. 20-28, 2021, 7 pages.

International Search Report and Written Opinion for International Application No. PCT/CN2022/100944, mailed Sep. 21, 2022, 09 Pages.

International Search Report and Written Opinion for International Application No. PCT/CN2022/100976, mailed Sep. 16, 2022, 10 Pages.

Retrieved from the internet: https://vcgit.hhi.fraunhofer.de/jvet-u-ee2/VVCSoftware_VTM/-/tree/VTM-11.2, Mar. 22, 2024, 1 page.

Strom J., et al., "Bilateral Filter After Inverse Transform," Joint Video Exploration Team (JVET) of ITU-T SG 16 WP 3 and ISO/IEC JTC 1/SC 29/WG 11, 4th Meeting: Chengdu, CN, Oct. 15-21, 2016, Document: JVET-D0069, 5 Pages, XP030247463.

Strom J., "Non-CE: Reduced Complexity Bilateral Filtering," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0885_v3, 03 Pages.

Vanam R., et al., "Bilateral Filter Simplification," Joint Video Exploration Team (JVET) of ITU-T SG 16 WP 3 and ISO/IEC JTC 1/SC 29/WG 11, 7th Meeting: Torino, IT, Jul. 13-21, 2017, Document: JVET-G0076_r1, 05 Pages.

Strom, J., et al., "Bilateral Loop Filter in Combination with SAO," 2019 Picture Coding Symposium (PCS), IEEE, Nov. 12-15, 2019, 5 pages.

International Search Report from PCT Application No. PCT/CN2022/100973 dated Sep. 21, 2022, 10 pages.

Document: JVET-V0095, Hu, N., et al., "AHG10: Using original samples for SAO and ALF optimization," Joint Video Experts Team (JVET) of ITU-T SG 16 WP3 and ISO/IEC JTC 1/SC 29 22nd Meeting, by teleconference, Apr. 20-28, 2021, 2 pages.

International Search Report from PCT Application No. PCT/CN2022/102926 dated Sep. 19, 2022, 9 pages.

Non-Final Office Action from U.S. Appl. No. 18/400,611 dated Apr. 28, 2025, 18 pages.

Non-Final Office Action from U.S. Appl. No. 18/394,516 dated Jul. 16, 2025, 20 pages.

Non-Final Office Action from U.S. Appl. No. 18/395,526 dated Aug. 5, 2025, 35 pages.

* cited by examiner

100

X  Location of luma sample
O  Location of chroma sample

FIG. 1

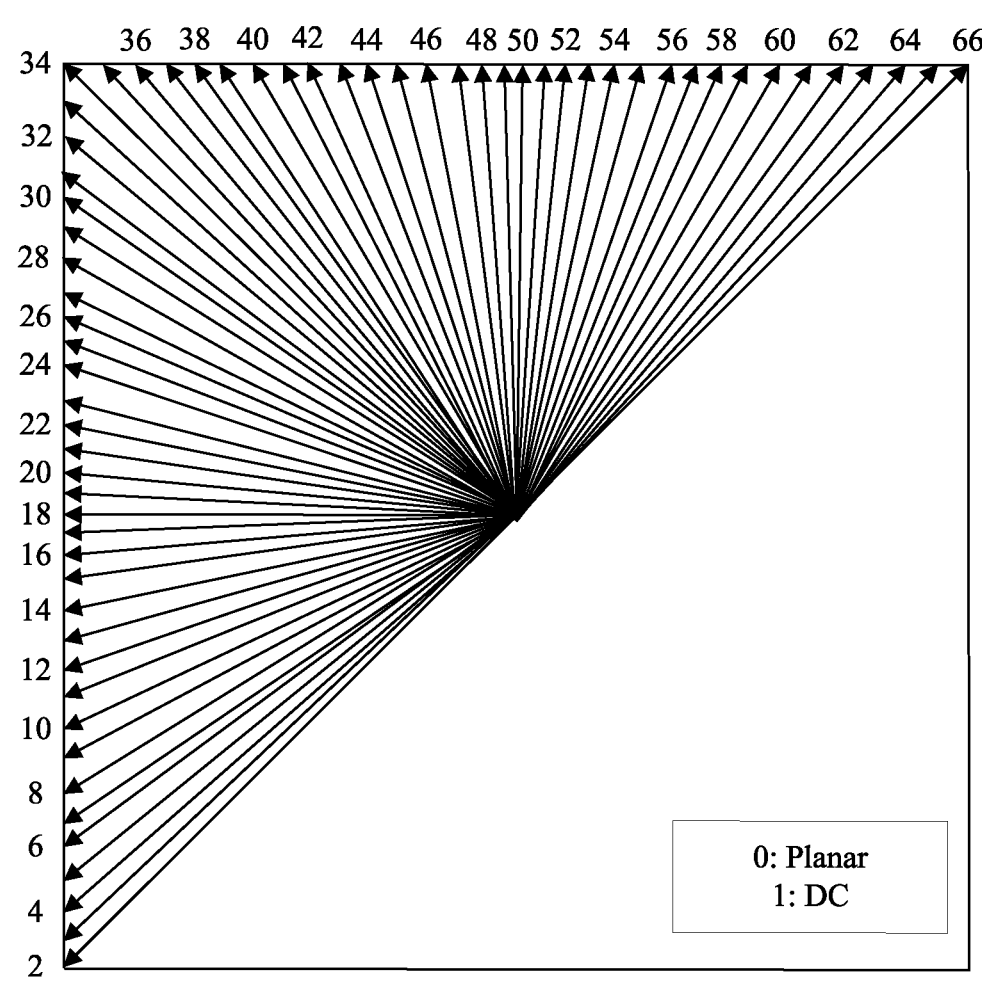
FIG. 2

○    Location of sample inside a video unit

□    Filter

⌐ ¬    Group

Video Unit

400

500

◯   Location of sample inside a video unit

◇   Location of padded sample

600

○     Location of sample inside a video unit

◇     Location of a padded sample

700

4000

4002

4010

4100

4200

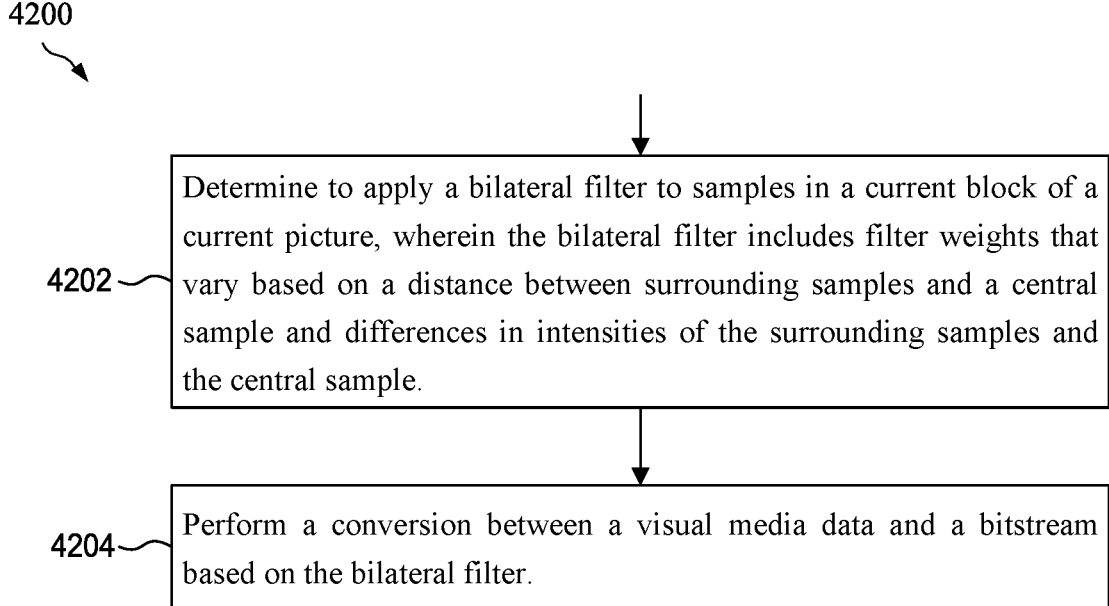

4202 — Determine to apply a bilateral filter to samples in a current block of a current picture, wherein the bilateral filter includes filter weights that vary based on a distance between surrounding samples and a central sample and differences in intensities of the surrounding samples and the central sample.

4204 — Perform a conversion between a visual media data and a bitstream based on the bilateral filter.

BILATERAL FILTER IN VIDEO CODING

CROSS-REFERENCE TO RELATED APPLICATIONS

This is a continuation of International Patent Application No. PCT/CN2022/100973, filed on Jun. 24, 2022 which claims the priority to and benefit of International Application No. PCT/CN2021/102281 filed Jun. 25, 2021. All the aforementioned patent applications are hereby incorporated by reference in their entireties.

TECHNICAL FIELD The present disclosure relates to video coding technologies.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to apply a bilateral filter to samples in a current block of a current picture, wherein the bilateral filter includes filter weights that vary based on a distance between surrounding samples and a central sample and differences in intensities of the surrounding samples and the central sample; and performing a conversion between a visual media data and a bitstream based on the bilateral filter.

Optionally, in any of the preceding aspects, another implementation of the aspect provides that the bilateral filter is applied according to:

$$I_{filtered} = I_C + e \times \left[ \sum_{i=0}^{i=n} \mu(\Delta_i, \Omega_i) \right]$$

where $I_{filtered}$ is an updated sample value, $I_C$ is the central sample located at a center of a filter shape, e is a strength factor, $\mu(\Delta_i, \Omega_i)$ is a function for determining a filtered weight of each surrounding sample at a position in the filter shape, $\Delta i$ is a difference between an ith surrounding sample and the central sample, $\Omega_i$ is a sum of vertical and horizontal distance between the ith surrounding sample and the central sample, and n is a total number of samples in the filter shape.

Optionally, in any of the preceding aspects, another implementation of the aspect provides that the $\mu(\Delta_i, \Omega_i)$ is formulated for each ith sample as follows:

$$\mu(\Delta, \Omega) = \left( e^{-\frac{\Delta^2}{2\sigma_r^2}} \times \Delta \right) \times \frac{e^{-\frac{(\Omega-1)}{2\sigma_d^2}}}{1 + 4e^{-\frac{1}{2\sigma_d^2}}}$$

where $\sigma_d$ and $\sigma_r$ are filtering parameters, $\Delta$ is a difference between each ith surrounding sample and the central sample, and $\Omega$ is a sum of vertical and horizontal distance between each ith surrounding sample and the central sample.

Optionally, in any of the preceding aspects, another implementation of the aspect provides that $\sigma_d$ and $\sigma_r$ are set based on coding mode, size, or coded information related to the current block.

Optionally, in any of the preceding aspects, another implementation of the aspect provides that e is set based on a width and a height of the current block.

Optionally, in any of the preceding aspects, another implementation of the aspect provides that e is set based on a maximum size of the current block in luma samples, denoted as max(width$_{luma}$, height$_{luma}$), a minimum size of the current block in luma samples, denoted as min(width$_{luma}$, height$_{luma}$), a maximum size of the current block in chroma samples, denoted as max(width$_{chroma}$, height$_{chroma}$), a minimum size of the current block in chroma samples, denoted as min(width$_{chroma}$, height$_{chroma}$), or combinations thereof.

Optionally, in any of the preceding aspects, another implementation of the aspect provides that the bilateral filter operates based on offsets, and wherein an offset for chroma samples is generated based on an offset for luma samples.

Optionally, in any of the preceding aspects, another implementation of the aspect provides that an offset for chroma samples is generated based on local information related to luma samples.

Optionally, in any of the preceding aspects, another implementation of the aspect provides that the bilateral filter is applied according to a look-up table.

Optionally, in any of the preceding aspects, another implementation of the aspect provides that the bilateral filter includes bit shifting operations.

Optionally, in any of the preceding aspects, another implementation of the aspect provides that the bilateral filter includes a first operation for luma components and a second operation for chroma components, wherein the first operation and the second operation are different.

Optionally, in any of the preceding aspects, another implementation of the aspect provides that the bilateral filter is applied to reconstructed samples.

Optionally, in any of the preceding aspects, another implementation of the aspect provides that operation of the bilateral filter is based on coded information related to the current block.

Optionally, in any of the preceding aspects, another implementation of the aspect provides that the coded information includes a coding mode, a motion information, a dimension of the current block, a quantization parameter (QP), sample values, variables related to the sample values, or combinations thereof.

Optionally, in any of the preceding aspects, another implementation of the aspect provides that the bilateral filter employs coded information related to a luma component to filter a chroma component.

Optionally, in any of the preceding aspects, another implementation of the aspect provides that the bilateral filter employs mean, variance, block dimensions, or combinations thereof, to generate filtered luma samples or filtered chroma samples.

Optionally, in any of the preceding aspects, another implementation of the aspect provides that the bilateral filter employs a square shape, a cross shape, a diamond shape, a symmetrical shape, an asymmetrical shape, or combinations thereof.

Optionally, in any of the preceding aspects, another implementation of the aspect provides that the bilateral filter employs luma sample information when filtering chroma samples.

Optionally, in any of the preceding aspects, another implementation of the aspect provides that the bitstream further comprises a reference picture containing a reference block including reference samples, and wherein the bilateral filter is applied to the samples of the current block based on the reference samples in the reference block.

Optionally, in any of the preceding aspects, another implementation of the aspect provides that padding is applied to the current block according to a mirroring function or an extending function.

Optionally, in any of the preceding aspects, another implementation of the aspect provides that the padding uses neighboring samples from a neighboring video unit when the neighboring samples have been decoded prior to the samples.

Optionally, in any of the preceding aspects, another implementation of the aspect provides that the bilateral filter accepts padded samples as input.

Optionally, in any of the preceding aspects, another implementation of the aspect provides that samples filtered by the bilateral filter are used to as padding.

Optionally, in any of the preceding aspects, another implementation of the aspect provides that the conversion includes encoding the visual media data into the bitstream.

Optionally, in any of the preceding aspects, another implementation of the aspect provides that the conversion includes decoding the visual media data from the bitstream.

A second aspect relates to an apparatus for processing video data comprising: a processor; and a non-transitory memory with instructions thereon, wherein the instructions upon execution by the processor, cause the processor to perform the method of any of the preceding aspects.

A third aspect relates to a non-transitory computer-readable storage medium storing instructions that cause a processor to perform the method of any of the preceding aspects.

A fourth aspect relates to a non-transitory computer-readable recording medium storing a bitstream of a video which is generated by a method performed by a video processing apparatus, wherein the method comprises: determining to apply a bilateral filter to samples in a current block of a current picture, wherein the bilateral filter includes filter weights that vary based on a distance between surrounding samples and a central sample and differences in intensities of the surrounding samples and the central sample; and generating the bitstream based on the determining A fifth aspect relates to a method for storing bitstream of a video comprising: determining to apply a bilateral filter to samples in a current block of a current picture, wherein the bilateral filter includes filter weights that vary based on a distance between surrounding samples and a central sample and differences in intensities of the surrounding samples and the central sample; generating the bitstream based on the determining; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 is a schematic diagram of an example of chroma subsampling.

FIG. 2 is a schematic diagram of an example intra prediction modes.

FIG. 10 is a flowchart for an example method of video processing.

DETAILED DESCRIPTION

Figure 3:
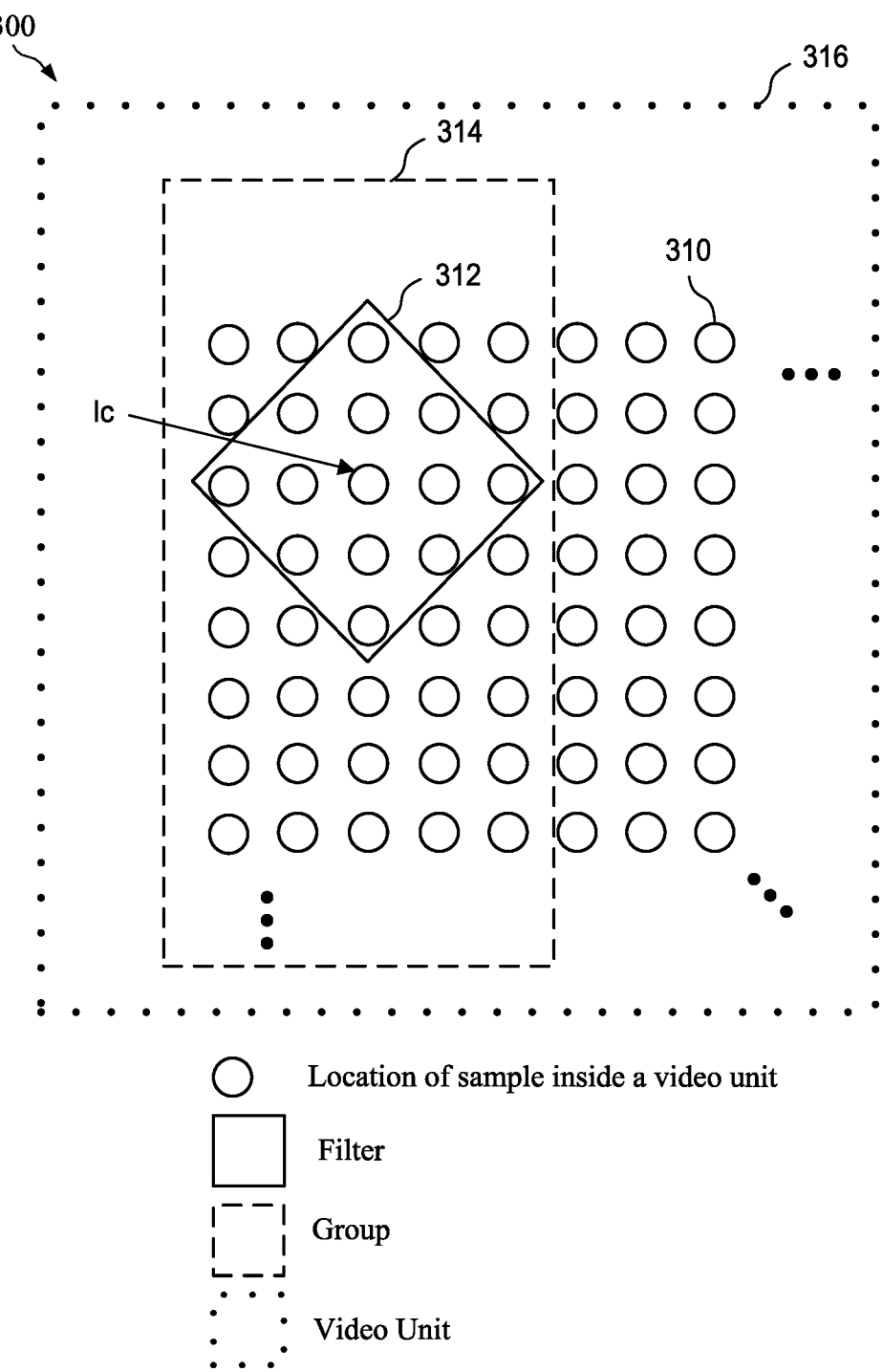
FIG. 3 is a schematic diagram of an example bilateral filter applied to samples in a video unit.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and embodiments illustrated below, including the exemplary designs and implementations illustrated and described herein, but may be modified within the scope of the appended claims along with their full scope of equivalents.

The present disclosure is related to video coding technologies. Specifically, this disclosure is related to in-loop filter and other coding tools in image/video coding. The concepts discussed herein may be applied individually or in various combination, to any video coding standard and/or video codec, such as like High Efficiency Video Coding (HEVC) and Versatile Video Coding (VVC).

The present disclosure includes the following abbreviations. Adaptive color transform (ACT), coded picture buffer (CPB), clean random access (CRA), coding block (CB), coding tree unit (CTU), coding unit (CU), coded video sequence (CVS), decoded picture buffer (DPB), decoding parameter set (DPS), general constraints information (GCI), high efficiency video coding, also known as Rec. ITU-T H.265|ISO/IEC 23008-2, (HEVC), joint exploration model (JEM), motion constrained tile sets (MCTS), network abstraction layer (NAL), output layer set (OLS), picture header (PH), picture parameter set (PPS), profile, tier, and level (PTL), prediction unit (PU), reference picture resampling (RPR), raw byte sequence payload (RBSP), supplemental enhancement information (SEI), slice header (SH), sequence parameter set (SPS), video coding layer (VCL), video parameter set (VPS), video usability information (VUI), and versatile video coding, also known as Rec. ITU-T H.266|ISO/IEC 23090-3, (VVC), VVC test model (VTM), transform unit (TU), coding unit (CU), deblocking filter (DF), sample adaptive offset (SAO), adaptive loop filter (ALF), coding block flag (CBF), quantization parameter (QP), rate distortion optimization (RDO), and bilateral filter (BF).

Figure 1:
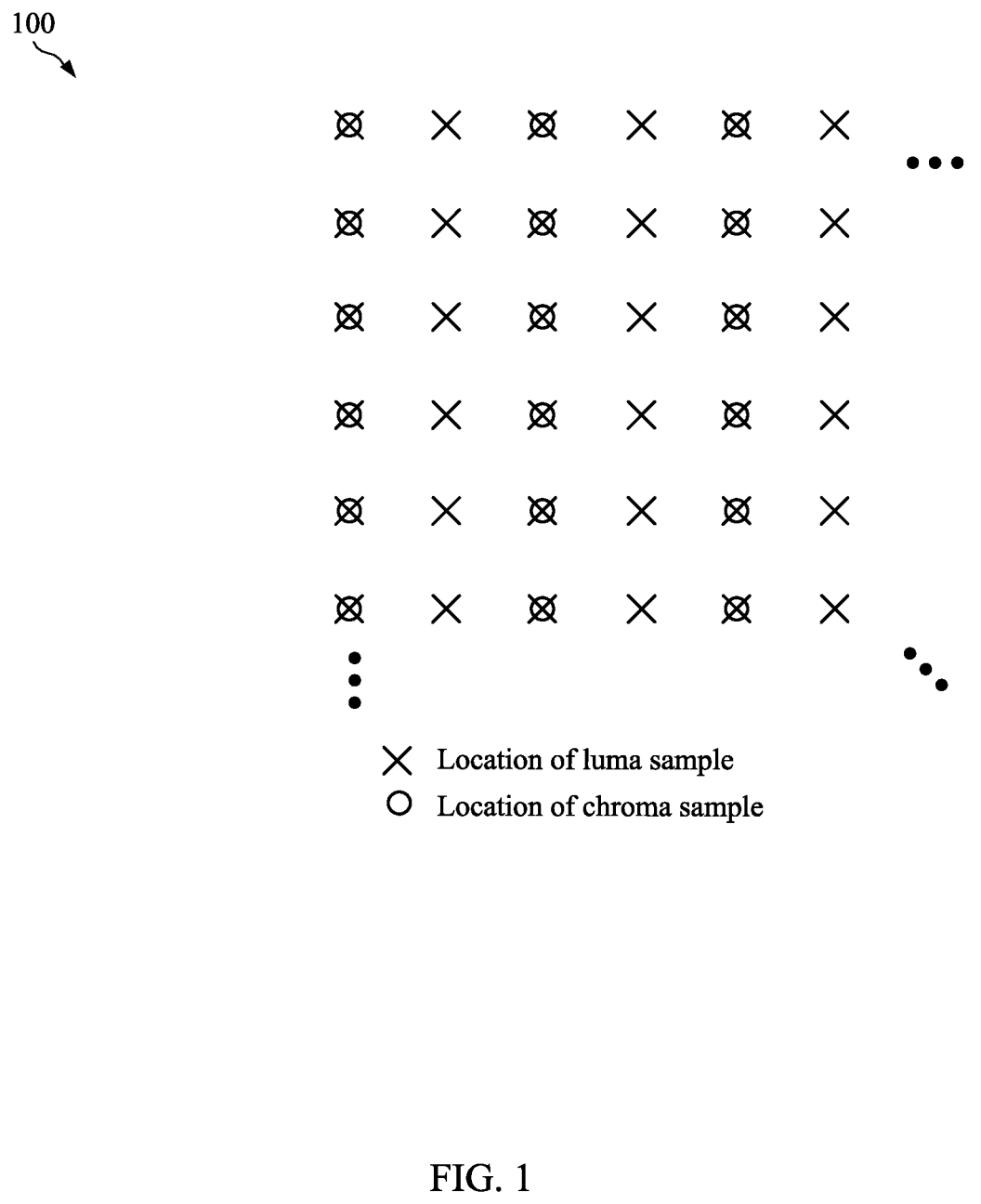

Video coding standards have evolved primarily through the development of the International Telecommunication Union (ITU) Telecommunications Standardization Sector (ITU-T) and International Organization for Standardization (ISO)/International Electrotechnical Commission (IEC) standards. The ITU-T produced H.261 and H.263, ISO/IEC produced Motion Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the further video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET initiated a coding standard targeting a 50% bitrate reduction as compared to HEVC. The is named Versatile Video Coding (VVC), and is associated with a VVC test model. As there are continuous efforts contributing to VVC standardization, FIG. 1 is a schematic diagram 100 of an example of chroma subsampling. In 4:2:2 component format, the two chroma components are sampled at half the sample rate of luma. Specifically, the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is schematic diagram 100. Schematic diagram 100 depicts nominal vertical and horizontal locations of 4:2:2 luma and chroma samples in a picture.

In 4:2:0 format, the horizontal sampling is doubled compared to 4:1:1, but the Cb and Cr channels are only sampled on each alternate line in this scheme. Accordingly, the vertical resolution is halved. The data rate is thus the same. Cb and Cr are each subsampled at a factor of two both horizontally and vertically. There are three variants of 4:2:0 schemes, each of which has different horizontal and vertical siting. In MPEG version two (MPEG-2), Cb and Cr are co-sited horizontally. In this scheme, Cb and Cr are sited between pixels in the vertical direction (sited interstitially).

In joint photographic experts group (JPEG), JPEG file interchange format (JFIF), H.261, and MPEG-1, Cb and Cr are sited interstitially, halfway between alternate luma samples. In 4:2:0 digital video (DV), Cb, and Cr are co-sited in the horizontal direction. In the vertical direction, they are co-sited on alternating lines.

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

VVC is continuously updated with additional techniques. The VVC working draft and test model (VTM) are then updated accordingly.

Color space and chroma subsampling is now discussed. Color space, also known as the color model (or color system), is a mathematical model, which describes the range of colors as tuples of numbers, such as 3 or 4 values or color components (e.g., red, green, and blue). A color space can be seen as an elaboration of the coordinate system and subspace. For video compression, most video codecs employ luma, blue difference chroma, red difference chroma (YCbCr) and red, green, blue, (RGB) color spaces. YCbCr, Y'CbCr, Y parallel blue (Pb) parallel red (Pr), and Y'PbPr, also written as YCBCR or Y'CBCR, is a family of color spaces used as a part of the color image pipeline in video and digital photography systems. Y' is the luma component and Cb and Cr are the blue-difference and red-difference chroma components. Y' (with prime) is distinguished from Y, which is luminance, meaning that light intensity is nonlinearly encoded based on gamma corrected RGB primaries.

Chroma subsampling is a practice of encoding images by implementing less resolution for chroma information than for luma information. This takes advantage of the human visual system's lower acuity for color differences than for luminance. In 4:4:4 component format, each of the three Y'CbCr components have the same sample rate, and thus there is no chroma subsampling. This scheme is sometimes used in high-end film scanners and cinematic postproduction.

As shown in Table 1, chroma subsampling width (SubWidthC) and chroma subsampling height (SubHeightC) values are derived from a chroma format identification code (chroma_format_idc) and a separate color plane flag (separate_colour_plane_flag). A coding flow of an example video codec is now discussed.

Figure 14:
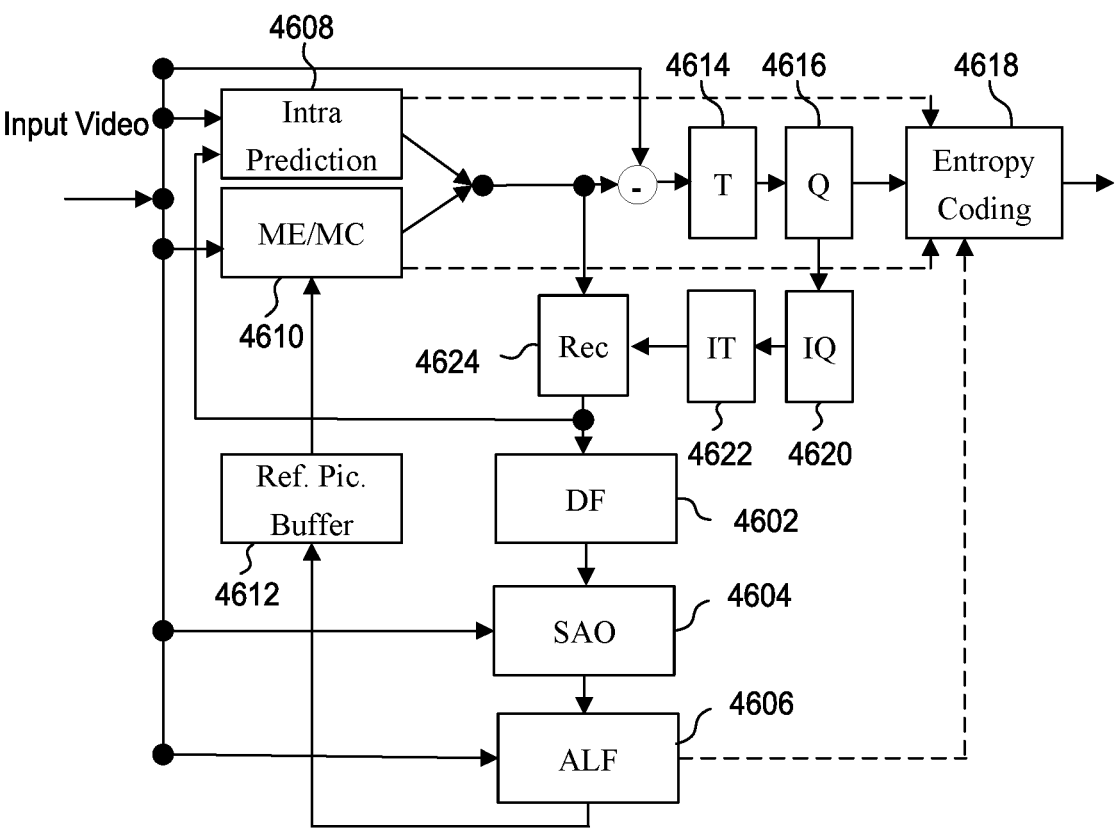
FIG. 14 is a schematic diagram of an example encoder.

FIG. 14 is now referenced. FIG. 14 shows an example of encoder 4600 as used in VVC. VVC contains three in-loop filtering blocks: deblocking filter (DF), sample adaptive offset (SAO) and adaptive loop filter (ALF). DF uses predefined filters. SAO and ALF utilize the original samples of the current picture to reduce the mean square errors between the original samples and the reconstructed samples. This is done by adding an offset and by applying a finite impulse response (FIR) filter, respectively. Coded side information signaling of the offsets and filter coefficients is also employed. ALF is located at the last processing stage of each picture and can be regarded as a tool to catch and fix artifacts created by the previous stages.

FIG. 2 is a schematic diagram 200 of an example intra prediction modes. Intra Prediction is now discussed. To capture the arbitrary edge directions presented in natural video, the number of directional intra modes is extended from 33 in HEVC to 65 in VVC. These denser directional intra prediction modes apply for all block sizes and for both luma and chroma intra predictions. Angular intra prediction directions are defined from 45 degrees to −135 degrees in clockwise direction as shown in schematic diagram 200. In VTM, several angular intra prediction modes are adaptively replaced with wide-angle intra prediction modes for non-square blocks. The replaced modes are signaled and remapped to the indexes of wide angular modes after parsing. The total number of intra prediction modes is 67 and is unchanged. Further, the intra mode coding is unchanged.

In the HEVC, every intra-coded block has a square shape and the length of each side is a power of two. Thus, no division operations are used to generate an intra-predictor using direct current (DC) mode. In VVC, blocks can have a rectangular shape that necessitates the use of a division operation per block in the general case. To avoid division operations for DC prediction, only the longer side is used to compute the average for non-square blocks.

For each inter-predicted CU, motion parameters including motion vectors, reference picture indices, a reference picture list usage index, and additional information are used for inter-predicted sample generation in VVC. The motion parameter can be signaled in an explicit or implicit manner. When a CU is coded with skip mode, the CU is associated with one PU and has no significant residual coefficients, no coded motion vector delta, and no reference picture index. A merge mode is specified whereby the motion parameters for the current CU are obtained from neighboring CUs. This includes spatial and temporal candidates, as well as additional schedules introduced in VVC. The merge mode can be applied to any inter-predicted CU, and is not only used for skip mode. The alternative to merge mode is the explicit transmission of motion parameters. In this case, a motion vector, a corresponding reference picture index for each reference picture list, a reference picture list usage flag, and other information are signaled explicitly for each CU.

The deblocking filter is now discussed. Deblocking filtering is an in-loop filter in a video codec. In VVC, the deblocking filtering process is applied on CU boundaries, transform subblock boundaries, and prediction subblock boundaries. The prediction subblock boundaries include the prediction unit boundaries introduced by the Subblock based Temporal Motion Vector prediction (SbTMVP) and affine modes. The transform subblock boundaries include the transform unit boundaries introduced by Subblock transform (SBT) and Intra Sub-Partitions (ISP) modes, as well as transforms due to implicit splits of large CUs. The processing order of the deblocking filter is defined as horizontal filtering for vertical edges for the entire picture first. This is followed by vertical filtering for horizontal edges. This specific order enables either multiple horizontal filtering or vertical filtering processes to be applied in parallel threads. Such filtering can still be implemented on a CTB-by-CTB basis with only a small processing latency.

SAO filters are now discussed. SAO is applied to the reconstructed signal after the deblocking filter by using offsets specified for each CTB by the encoder. The video encoder first makes the decision on whether or not the SAO process is to be applied for current slice. If SAO is applied for the slice, each CTB is classified as one of five SAO types as shown in table 2. The SAO is employed to classify pixels into categories and reduce the distortion by adding an offset to pixels of each category. SAO operation includes edge offset (EO), which uses edge properties for pixel classification in SAO type 1 to 4. SAO also includes a band offset (BO) which uses pixel intensity for pixel classification in SAO type 5. Each applicable CTB has SAO parameters including a SAO merge left flag (sao_merge_left_flag), a SAO merge up flag (sao_merge_up_flag), SAO type, and four offsets. If sao_merge_left_flag is equal to 1, the current CTB reuses the SAO type and offsets of the CTB to the left.

If sao_merge_up_flag is equal to 1, the current CTB reuses SAO type and offsets of the CTB above. Table 2 is a specification of SAO types.

TABLE 2

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | band offset | 4 |

The adaptive loop filter is now discussed. Adaptive loop filtering for video coding is used to minimize the mean square error between original samples and decoded samples by using a Wiener-based adaptive filter. The ALF is located at the last processing stage for each picture and can be regarded as a tool to catch and correct artifacts from previous stages. The suitable filter coefficients are determined by the encoder and explicitly signaled to the decoder. In order to achieve better coding efficiency, especially for high resolution videos, local adaptation is used for luma signals by applying different filters to different regions or blocks in a picture. In addition to filter adaptation, filter on/off control at coding tree unit (CTU) level is also helpful for improving coding efficiency. Syntax-wise, filter coefficients are sent in a picture level header called an adaptation parameter set (APS). Filter on/off flags of CTUs are interleaved at CTU level in the slice data. This syntax design not only supports picture level optimization but also achieves a low encoding latency.

A bilateral image filter is now discussed. The bilateral image filter is a nonlinear filter that smooths the noise while preserving edge structures. Bilateral filtering is a technique to make the filter weights decrease not only with the distance between the samples, but also with increasing difference in intensity. In this way, over-smoothing of edges can be ameliorated. A weight is defined as:

$$w(\Delta x, \Delta y, \Delta I) = e^{-\frac{\Delta x^2 + \Delta y^2}{2\sigma_d^2} - \frac{\Delta I^2}{2\sigma_r^2}},$$

where $\Delta x$ and $\Delta y$ is the distance in the vertical and horizontal and $\Delta I$ is the difference in intensity between the samples. The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Combining the range filter and the domain filter, a bilateral filter at an edge pixel becomes an elongated Gaussian filter that is oriented along the edge and is greatly reduced in gradient direction. For this reason, the bilateral filter can smooth the noise while preserving edge structures.

A bilateral filter in video coding is now discussed. The bilateral filter acts as a loop filter in parallel with the sample adaptive offset (SAO) filter. Both the bilateral filter and SAO act on the same input samples. Each filter produces an offset. These offsets are then added to the input sample to produce an output sample that goes to the next stage after clipping. The spatial filtering strength $\sigma_d$ is determined by the block size, with smaller blocks filtered more strongly. The intensity filtering strength $\sigma_r$ is determined by the quantization parameter. Stronger filtering is used for higher QPs. Only the four closest samples are used, so the filtered sample intensity $I_F$ can be calculated as:

$$I_F = I_C + \frac{w_A \Delta I_A + w_B \Delta I_B + w_L \Delta I_L + w_R \Delta I_R}{w_C + w_A + w_B + w_L + w_R}$$

where $I_C$ denotes the intensity of the center sample, $\Delta I_A = I_A - I_C$ the intensity difference between the center sample and the sample above and, $\Delta I_B$, $\Delta I_L$ and $\Delta I_R$ denote the intensity difference between the center sample and that of the sample below, to the left, and to the right respectively.

The following are example technical problems solved by disclosed embodiments.

Example designs for bilateral filters in video coding have the following problems. Ringing artifacts inside a reconstructed video are not completely removed by in-loop filters. This is especially the case for chroma components.

Disclosed herein are mechanisms to address one or more of the problems listed above. For example, the present disclosure includes various examples of a bilateral filter configured to remove ringing artifacts, and hence improve the output of the in-loop filtering process. In an example, the bilateral filter includes a filter shape that is positioned over a group of samples. The filter is applied to a central sample based on surrounding samples in the filter shape. The filter is then shifted to different central samples until an entire video unit (e.g., TU, CTU, CU, CB, etc.) is filtered. For example, the value of the central sample may be modified by values of the surrounding samples that are weighted based on distances and modified by a strength factor. The bilateral filter can be applied to luma components, chroma components, or both. Further, in some examples filter based changes and/or information related to luma components can be used as input when filtering corresponding chroma components.

In another example, the bilateral filter may be configured as an adaptive bilateral filter that changes based on statistical information related to the picture. For example, video units may be grouped together based on statistical information, and the bilateral filter can be applied differently to each video unit group, for example by employing different parameters. In an example, the video unit groups may be selected based on a video unit class index, unit mean value, variance, size, or combinations thereof. In another example, the samples in the picture can be grouped into sample groups (e.g., irrespective of video unit), and the bilateral filter can be applied differently to each sample group, for example by employing different parameters. In an example, the sample groups may be selected based on statistical information determined by comparing samples within a window. For example, such statistical information may include mean value, a variance, a minimum gradient, a maximum gradient, a mean gradient, or combinations thereof. The bilateral filter may also be applied at various positions relative to other in-loop filters.

In another example, the various video information may be used to determine whether and how a bilateral filter should be applied to samples. For example, the bilateral filter may be conditionally applied based on items related to a video unit, such as a number transform coefficient levels, a color component, a quantization parameter (QP) relative to a threshold, a minimum or maximum size relative to a threshold, a number of samples relative to a threshold, a coding mode of the video unit, or combinations thereof. In another example, the bilateral filter may be conditionally applied based on syntax elements in a bitstream. The syntax elements may indicate whether the bilateral filter is applied to a coding tree unit (CTU), a coding unit (CU), and/or a transform unit (TU). In some examples, the syntax element may be omitted from the bitstream, and a decoder can infer that the bilateral filter is not applied in certain cases. For example, the syntax element can be omitted when: a channel type of a current video unit is not equal to luma, a QP of a current video unit is smaller than a threshold, a minimum of a width and a height of the current video unit is equal to or larger than a size threshold, a maximum of the width and the height of the current video unit is equal to or larger than a size threshold, both the width and height of the current video unit is equal to or larger than a threshold, or combinations thereof. In another example, the syntax element may only be included in a bitstream for chroma components when: luma sample adaptive offset (SAO) is enabled, luma bilateral filter is enabled, a coding block flag (CBF) is equal to one, or combinations thereof.

FIG. 3 is a schematic diagram 300 of an example bilateral filter 312 applied to samples 310 in a video unit 316. A sample 310 is a pixel value. The video coding process splits pixel values into a color space, such as YCrCb and/or RGB. Accordingly, a sample 310 may include a luma component (light value) from a pixel, a chroma component (color value) for a pixel, or both depending on the context. Samples 310 can be partitioned into various video units 316, such as a sequence, a picture, a subpicture, a slice, a tile, a coding tree unit (CTU), a CTU row, a coding unit (CU), a prediction unit (PU), a transform unit (TU), a coding tree block (CTB), a prediction block (PB), a transform block (TB), and/or a color component of any of the forgoing. For example, samples 310 can be divided into CTUs, which can be partitioned into blocks, which is a general term that may include CUs, PUs, PBs, TB s, TUs, etc. Each current block is then coded by intra prediction and/or inter prediction by reference to one or more reference blocks. Any difference between the reference block and the current block is not coded by the prediction process. Such a difference is referred to as a residual. A transform can be applied to compress the residual. Further, the residual can be quantized, which further compresses the residual but loses data. At the encoder, the blocks are then decoded and reconstructed for use as reference blocks for subsequent pictures. At the decoder, the blocks are decoded and reconstructed for display. In either case, block based coding scheme often produce artifacts, which are errors in sample values when the samples 310 are reconstructed. Filters can be applied to mitigate such artifacts. For example, the filters can be designed to adjust the values of the samples 310 in order to counteract expected and/or observed coding errors. For example, a filter may be applied consistently to all samples and/or can be applied when certain conditions occur. In another example, an encoder can reconstruct a video unit, review the video unit for errors, determine to apply the filter, and then signal filter usage to the decoder via the bitstream.

The present disclosure relates specifically to a bilateral filter 312. The bilateral filter 312 is designed to address artifacts, such as ringing artifacts, created by the transform and quantization process. A ringing artifact is a false signal that occurs at a transition point, such as a block edge. A ringing artifact may appear as an extra band along a block edge. The extra band is an echo of the real edge. The bilateral filter applies computations to the samples 310 to correct such artifacts.

In an example, the bilateral filter 312 is positioned around an ith central sample ($I_C$) and includes several samples that surround the central sample. The bilateral filter 312 filters the central sample and can then be moved to another central sample. This process can be repeated until an entire video unit 316 containing the samples 310 is filtered. In an example, the bilateral filter 312 includes filter weights that vary based on distances between corresponding surrounding samples and a central sample as well as differences in intensities of the surrounding samples and the central sample. In an example, the bilateral filter 312 is applied according to:

$$I_{filtered} = I_C + e \times \left[ \sum_{i=0}^{i=n} \mu(\Delta_i, \Omega_i) \right]$$

where $I_{filtered}$ is an updated sample value, $I_C$ is the central sample located at a center of a filter shape, e is a strength factor, $\mu(\Delta_i, \Omega_i)$ is a function for determining a filtered weight of each surrounding sample at a position in the filter shape, $\Delta_i$ is a difference between an ith surrounding sample and the central sample, $\Omega_i$ is a sum of vertical and horizontal distance between the ith surrounding sample and the central sample, and n is a total number of samples in the filter shape.

Further, the $\mu(\Delta_i, \Omega_i)$ can be formulated for each ith sample as follows:

$$\mu(\Delta, \Omega) = \left( e^{-\frac{\Delta^2}{2\sigma_r^2}} \times \Delta \right) \times \frac{e^{-\frac{(\Omega-1)}{2\sigma_d^2}}}{1 + 4e^{-\frac{1}{2\sigma_d^2}}}$$

where $\sigma_d$ and $\sigma_r$ are filtering parameters, $\Delta$ is a difference between each ith surrounding sample and the central sample, and $\Omega$ is a sum of vertical and horizontal distance between each ith surrounding sample and the central sample. In an example, $\sigma_d$ and $\sigma$r are set based on coding mode, size, or coded information related to the current block/video unit. In an example, e is set based on a width and a height of the current block. In an example, e is set based on a maximum size of the current block in luma samples, denoted as max(width$_{luma}$, height$_{luma}$), a minimum size of the current block in luma samples, denoted as min(width$_{luma}$, height$_{luma}$), a maximum size of the current block in chroma samples, denoted as max(width$_{chroma}$, height$_{chroma}$), a minimum size of the current block in chroma samples, denoted as min(width$_{chroma}$, height$_{chroma}$), or combinations thereof.

In an example, the bilateral filter 312 operates based on offsets. An offset may be a change to a sample 310 caused by the filter. Accordingly, a bilateral filter generates an offset for each sample 310. In an example, the offsets for the luma samples can be used as input for filtering chroma samples. In another example, local information related to the luma samples can be used as input for filtering chroma samples. Local information may include a difference between samples and/or a distance between samples. In another example, statistical information related to the luma samples can be used as input for filtering chroma samples. Such statistical information may include mean, variance, block dimensions, etc. In a similar manner, offsets and/or local information related to reference samples in a reference picture can be used as inputs to filter the samples 310 in a current picture.

In an example, the bilateral filter 312 can be applied by performing computations at the encoder and the decoder. For example, the encoder and/or decoder can perform bit shifting operations to compute the changes and/or offsets to the samples 310. In another example, the bilateral filter 312 can be implemented as a look-up table that is referenced for each sample 310.

In an example, the bilateral filter 312 can be applied differently to different components. For example, the bilateral filter 312 can employ different parameters, filter shapes, computations, etc. when filtering luma components than when filtering chroma components. In addition, the bilateral filter 312 is depicted as employing a diamond shape, but many filter shapes may be employed such as a square shape, a cross shape, a diamond shape, a symmetrical shape, an asymmetrical shape, or combinations thereof. In an example, the bilateral filter 312 is applied to reconstructed samples 310. In other examples, the bilateral filter 312 is applied to prediction samples prior to reconstruction by adding residual to the prediction.

In an example, the operation of the bilateral filter 312 may be modified based on coded information related to the video unit 316. The coded information may include a coding mode, a motion information, a dimension of the video unit 316, a QP, sample 310 values, variables related to the sample 310 values, or combinations thereof. In an example, the bilateral filter 312 employs mean, variance, video unit 316 dimensions, or combinations thereof, to generate filtered luma samples or filtered chroma samples. It should be noted that the samples 310 may be filtered in an unpadded state in some examples. In other examples, the samples 310 in a video unit may be padded prior to filtering, for example as discussed below.

In an example, the bilateral filter 312 is configured to be adaptively applied to different picture regions. For example, various types of picture data can be grouped based on statistical information. The bilateral filter 312 can then be applied to each group 314. For example, the bilateral filter 312 can employ different parameters when filtering different groups 314. A group 314 can be a video unit group or a sample group, depending on the example. For example, one or more video units 316 can be placed in a group 314 based on statistical information related to the video units 316. In such a case, the group 314 may be referred to as a video unit group. In another example, samples 310 can be placed in a group 314 based on statistical information related to the video units 316. In such a case, the group may be referred to as a sample group.

When the group 314 is a video unit group, the statistical information may include a class index of a video unit computed according to:

$$index_{unit} = 0 \text{ when } (0 \leq info_{unit} < T_1)$$

$$\dots$$

$$index_{unit} = N_{unit} - 2 \text{ when } (T_{N-2} \leq info_{unit} < T_{N-1})$$

$$index_{unit} = N_{unit} - 1 \text{ when } (T_{N-1} \leq info_{unit})$$

where $index_{unit}$ is the class index of the video unit, $[T_1, T_2, \dots T_{N-1}]$ is a set of threshold values, and $info_{unit}$ is a variance or a unit mean value.

In another example, the statistical information may include a class index of a video unit computed according to:

$$index_{unit} = \lfloor info_{unit}/T_{unit\_class} \rfloor$$

where $index_{unit}$ is the class index of the video unit, $info_{unit}$ is a variance or a unit mean value, $T_{unit\_class}$ is a fixed threshold value, and where $0 \leq index_{unit} < N_{unit}$.

In another example, the statistical information may include a unit mean value of a video unit computed according to:

$$S = w_{unit} \times h_{unit}$$

$$mean_{unit} = \left( \sum_{i=0}^{i=S-1} p_i \right) / S$$

where i is a position inside the video unit, $p_i$ is a sample located at position i, s is a size of the video unit, $w_{unit}$ is a width of the video unit, $h_{unit}$ is a height of the video unit, and $mean_{unit}$ is the unit mean value.

In another example, the statistical information may include a variance of a video unit computed according to:

$$corr_{unit} = \left( \sum_{i=0}^{i=S-1} p_i \times p_i \right) / S$$

$$var_{unit} = corr_{unit} - mean_{unit}^2$$

where i is a position inside the video unit, $p_i$ is a sample located at position i, s is a size of the video unit, $mean_{unit}$ is a unit mean value, $corr_{unit}$ is a correlation between sample values in the video unit, and $var_{unit}$ is a variance of the video unit.

In another example, the statistical information may include a width of a video unit 316, a height of the video unit 316, or combinations thereof.

When the group 314 is a sample group, the statistical information may be contained within a window around the samples 310. For example, the statistical information within the window may include a mean value, a variance, a minimum gradient, a maximum gradient, a mean gradient, or combinations thereof. Further, the window may be in various window shapes, such as a square shape, a cross shape, a diamond shape, a symmetrical shape, an asymmetrical shape, or combinations thereof.

In another example, the bilateral filter 312 is applied to subblocks of samples 310. A subblock may be a specified region of a video unit 316. In an example, the filtering results related to a first subblock are used to filter samples of a second subblock. In another example, unfiltered samples related to a first subblock are used to filter samples of a second subblock.

In an example, a determination of whether to apply the bilateral filter 312 may be made based on various video information related to the samples 310. For example, the determination of whether to apply the bilateral filter 312 can be made based on coded information, which may include transform coefficients, color components, QPs, video unit 316 size and/or dimensions, a number of samples in the video unit 316, and/or coding mode information, such as intra mode, inter prediction mode, merge flag/index, affine flag, motion vector, reference index, or combinations thereof.

In an example, the bilateral filter 312 is applied to the video unit 316 when the video unit 316 includes one or more transform coefficient levels not equal to zero, and the bilateral filter 312 is disallowed when the video unit 316 includes only zero transform coefficient levels. In an example, the bilateral filter 312 is applied when the video unit 316 contains a color component, and the bilateral filter 312 is disallowed when the video unit 316 contains a luma component. In an example, the bilateral filter 312 is applied when a QP for the video unit 316 is larger than a QP threshold ($T_{QP}$), and the bilateral filter 312 is disallowed when the QP for the video unit 316 is less than or equal to the $T_{QP}$. In an example, the bilateral filter 312 is applied when: a minimum size of the video unit 316 is smaller than a size threshold ($T_{size\ min}$), a maximum size of the video unit 316 is smaller than a size threshold ($T_{size\ max}$), a width of the video unit 316 and a height of the video unit 316 are smaller than a threshold ($T_{size\ both}$), or combinations thereof. In another example, the bilateral filter 312 is applied when: a minimum size of the video unit 316 is larger than a size threshold ($T_{size\ min}$), a maximum size of the video unit 316 is larger than a size threshold ($T_{size\ max}$), a width of the video unit 316 and a height of the video unit 316 are larger than a threshold ($T_{size\ both}$), or combinations thereof. In another example, the bilateral filter 312 is applied when a number of samples 310 in the video unit 316 times a factor ($F_{num}$) is larger than a threshold ($T_{num}$).

In an example, the determination of whether to apply the bilateral filter 312 can be made based on syntax elements signaled in the bitstream. For example, a syntax element can indicate whether the bilateral filter 312 is applied to a slice, CTU, CU, and/or TU. The syntax element can be included in a video parameter set (VPS), sequence parameter set (SPS), picture parameter set (PPS), adaptation parameter set (APS), slice header, a picture header, etc.

In an example, the syntax element can be included in the bitstream when the bilateral filter 312 is applied to video units 316 and omitted from the bitstream when the bilateral filter 312 is disallowed for video units 316. In an example, the syntax element can be omitted from the bitstream when: a channel type of a current CU is not equal to luma, a QP of a current CU is smaller than a threshold ($T_{CUQP}$), a minimum of a width and a height of the current CU is equal to or larger than a size threshold ($T_{CUmin}$), a maximum of the width and the height of the current CU is equal to or larger than a size threshold ($T_{CUmax}$), both the width of the current CU and the height of the current CU are equal to or larger than a threshold ($T_{CUboth}$), or combinations thereof. In another example, the syntax element is omitted from the bitstream when: a channel type of a current TU is not equal to luma, a QP of a current TU is smaller than a threshold ($T_{TUQP}$), a minimum of a width and a height of the current TU is equal to or larger than a size threshold ($T_{TUmin}$) a coding block flag (CBF) of the current TU is set to false, a maximum of the width and the height of the current TU is equal to or larger than a size threshold ($T_{TUmax}$), both the width of the current TU and the height of the current TU are equal to or larger than a threshold ($T_{TUboth}$), or combinations thereof. In an example, the syntax element may only be included in the bitstream for chroma components when luma SAO is enabled, luma bilateral filter is enabled, CBF is equal to one, or combinations thereof.

Figure 4:
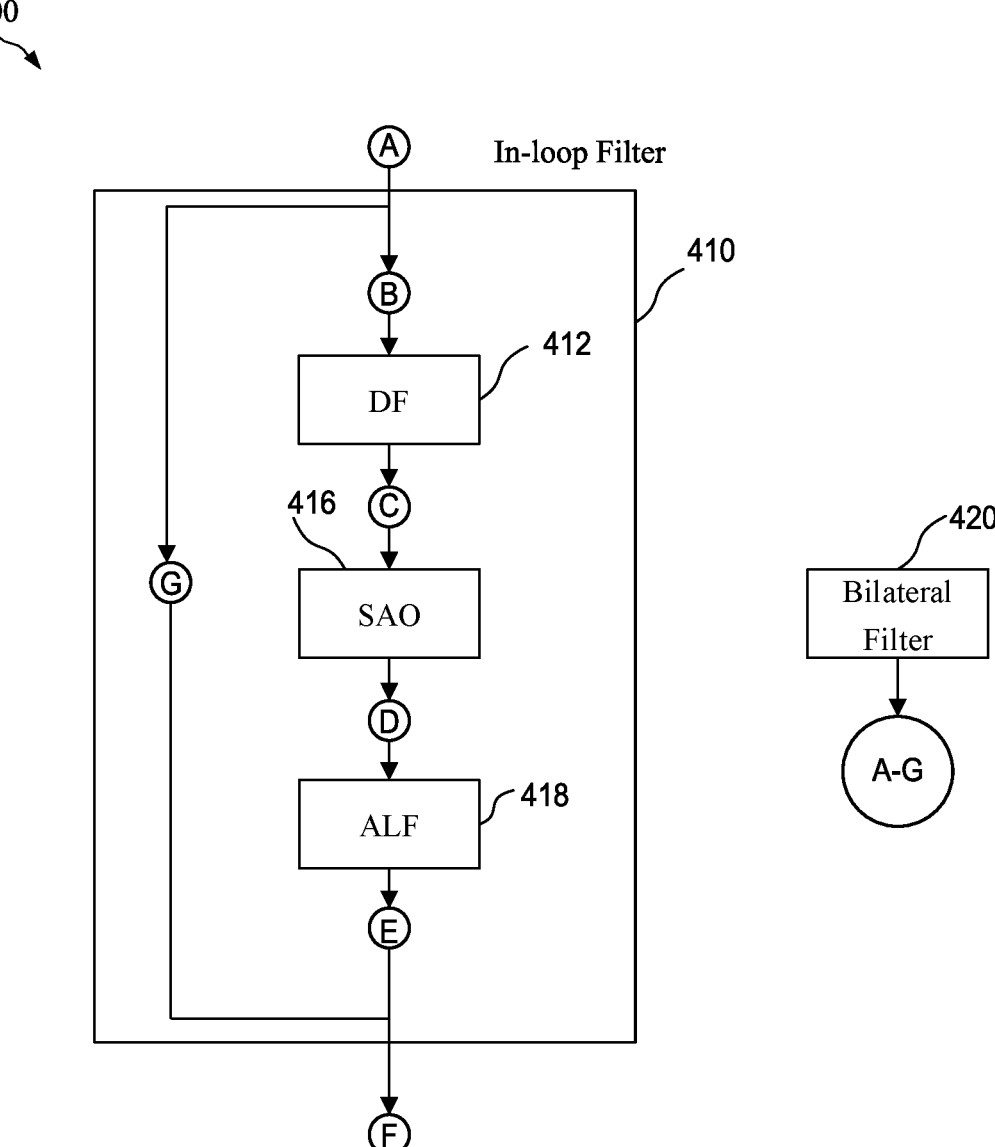
FIG. 4 is a schematic diagram of an example bilateral filter applied in conjunction with in-loop filtering.

FIG. 4 is a schematic diagram 400 of an example bilateral filter 420 applied in conjunction with in-loop filtering. An in-loop filter 410 may comprise a deblocking filter (DF) 412, a sample adaptive offset (SAO) filter 416, and an adaptive loop filter (ALF) 418. Such filters may be applied to video units in the order shown in schematic diagram 400. For example, a video unit can be reconstructed. The DF 412 is applied prior to the SAO filter 416. The ALF 418 is applied after the SAO filter 416. The DF 412, the SAO filter 416, and the ALF 418 are as discussed herein above. The present disclosure addresses a bilateral filter 420, which may operate as discussed with respect to schematic diagram 300. As shown, the bilateral filter 420 can be applied at various positions within the in-loop filter 410. The bilateral filter 420 may also be applied prior to application of the in-loop filter 410 or after application of the in-loop filter 410. Possible positions of the bilateral filter 420 are denoted as positions A-G.

In position A, the bilateral filter 420 may be applied before in-loop filtering. For example, the bilateral filter 420 may be applied to prediction results prior to application of residual to create reconstructed samples. The bilateral filter 420 may also be applied at position B as part of the in-loop filter 410 and before the DF 412. The bilateral filter 420 may also be applied at position C after the DF 412 and prior to SAO filter 416. The bilateral filter 420 may also be applied at position D after the SAO filter 416 and prior to the ALF 418. The bilateral filter 420 may also be applied at position E after the ALF 418. The bilateral filter 420 may also be applied at position G, which is in parallel with any of the DF 412, the SAO filter 416, and/or the ALF 418. For example, the bilateral filter and a second filter may be applied to the same samples. The bilateral filter 420 may produce a first offset, the second filter may produce a second offset, and the bilateral filter 420 may produce an output sample based on the first offset and the second offset. The bilateral filter 420 may also be applied at position E as part of the in-loop filter 410 and after the ALF 418. Further, the bilateral filter 420 may also be applied in position F, which is after completion of the in-loop filtering. For example, the bilateral filter 420 may be applied in a post processing stage after application of the in-loop filter 410.

To solve the above problems, and others, methods as summarized below are disclosed. The items should be considered as examples to explain the general concepts and should not be interpreted in a narrow way. Furthermore, these items can be applied individually or combined in any manner. It should be noted that the proposed methods may be used as in-loop filters or post-processing.

EXAMPLE 1

In an example, a Bilateral Filter (BF) can be applied to one or more than one color component. In one example, the BF may employ different filtering methods (e.g., different parameters, different filter shape, etc.) when the BF is applied to different components. In another example, the BF may employ the same filtering method when applied to different components. In one example, the BF may employ a first filter method when applied to luma component. The BF may then employ a second filtering method when applied to the two chroma components, and the second filtering method may be the same for both chroma components.

EXAMPLE 2

In one example, the bilateral filter can be used to further modify the reconstructed chroma samples/pixels of a video unit.

EXAMPLE 3

In one example, the modification of a reconstructed luma or chroma sample/pixel of the video unit may be dependent on the coded information of one or more regions or designed filter shapes. Such regions or filter shapes contain at least one reconstructed luma or chroma sample/pixel.

EXAMPLE 4

The coded information may include any coding mode or motion information such as intra-prediction mode, reference list/index, motion vector, etc. The coded information may include dimensions of the video unit. The coded information may include QP. The coded information may include sample values or any variables derived based on sample values. The coded information of a first color component may be used when a BF filters a second color component. For example, the coded information of the luma component may be used by the BF to filter the Cb or Cr component.

EXAMPLE 5

In one example, coded/statistical information (e.g., mean/variance/block dimensions) may be used by the BF to generate the filtered luma or chroma samples/pixels. In one example, the coded/statistical information may be generated from luma samples/pixels inside a video unit. In one example, the coded/statistical information may be generated from chroma samples/pixels inside a video unit.

EXAMPLE 6

In one example, the designed filter shape of the BF may be a square, a diamond, or other shapes. In one example, the filter shape may be a square. In one example, the filter shape may be a cross. In one example, the filter shape may be a diamond. In one example, the filter shape may be symmetrical. In one example, the filter shape may be asymmetrical. In one example, indications of the filter shape may be signaled, pre-defined, derived on-the-fly. For example, an index may be signaled to indicate the filter shape from a set of candidate shapes. In one example, the size of the designed filter shape may be pre-defined, signaled, derived on-the-fly, or derived based on the decoded information.

EXAMPLE 7

In one example, the BF may utilize coded/statistical information when filtering a luma or chroma sample/pixel. In one example, the BF may generate a filtering result according to the following formulation:

$$I_{filtered} = I_C + e \times \left[ \sum_{i=0}^{i=n} \mu(\Delta_i, \Omega_i) \right]$$

where $I_{filtered}$ stands for the updated/modified luma or chroma sample/pixel, and $I_C$ stands for the unmodified luma or chroma sample/pixel located at the center of the filtering shape. The delta ($\Delta$) denotes the difference between a corresponding reference sample and an unmodified central sample. The omega ($\Omega$) denotes the sum of vertical and horizontal distance between a reference sample and the central sample. The n stands for the total number of samples inside the filtering shape, and e stands for the strength factor. The $\mu(\Delta, \Omega)$ is a function for computing the filtering weight of each position in the filtering shape.

EXAMPLE 8

In one example, the function $\mu(\Delta, \Omega)$ may be formulated as:

$$\mu(\Delta, \Omega) = \left(e^{-\frac{\Delta^2}{2\sigma_r^2}} \times \Delta\right) \times \frac{e^{-\frac{(\Omega-1)}{2\sigma_d^2}}}{1 + 4e^{-\frac{1}{2\sigma_d^2}}}$$

where $\sigma_d$ and $\sigma_r$ are two filtering parameters and other parameters are as described above. In one example, the function $\mu(\Delta, \Omega)$ may be implemented by a look-up-table.

EXAMPLE 9

In one example, different samples or different positions inside a video unit may use uniform parameters or a look-up table. In one example, different samples or different positions inside a video unit may use different parameters or look-up-tables. In one example, the parameter such as $\sigma_d$ and $\sigma_r$ may be pre-defined, searched, determined on-the-fly, or signaled in the bitstream.

EXAMPLE 10

In one example, the parameters mentioned above may be set based on coding mode, size, or other coded information describing a current video unit. In one example, the parameters mentioned above may be signaled from the encoder to the decoder. In one example, the parameter e may be pre-defined, searched, determined on-the-fly, or signaled in the bitstream. In one example, the parameter e may be set based on coding mode, size, or other coded information describing a current video unit. In one example, the parameter e may be set based on the luma size of current video unit. In one example, the parameter e may be set based on the maximum luma size, denoted by $\max(\text{width}_{luma}, \text{height}_{luma})$, or the minimum luma size, denoted by $\min(\text{width}_{luma}, \text{height}_{luma})$, of the current video unit. In one example, the parameter e may be set based on the size of the current video unit in luma samples, denoted by $\text{width}_{luma} \times \text{height}_{luma}$. In another example, the parameter e may be set based on the chroma size of current video unit. In one example, the parameter e may be set based on the maximum chroma size, denoted by $\max(\text{width}_{chroma}, \text{height}_{chroma})$, or the minimum chroma size, denoted by $\min(\text{width}_{chroma}, \text{height}_{chroma})$. In one example, the parameter e may be set based on the size of the current video unit in chroma samples, denoted by $\text{width}_{chroma} \times \text{height}_{chroma}$. In one example, the parameter e may be signaled from the encoder to the decoder.

EXAMPLE 11

In one example, the filtering offset of chroma samples may be generated based on a filtering offset of luma samples or information of luma samples. In one example, the filtering offset of chroma samples may be computed by a combination of a computed filtering offset of both chroma and luma samples with a weighted sum method. In one example, the filtering offset of chroma samples may be generated by using local information of luma samples, such as a difference or a distance between corresponding luma samples. In one example, the luma or chroma samples that are filtered by the BF may be used to update the reconstruction luma or chroma samples and/or residuals of a video unit.

EXAMPLE 12

In one example, the BF filtering process as described above may be implemented by operations on integers. For example, variables may be left-shifted and/or right-shifted before, during, and/or after the process to maintain a suitable calculation precision.

EXAMPLE 13

In an example, luma samples may be used during the BF filtering of chroma samples.

EXAMPLE 14

In an example, a BF cross-picture filtering method may be employed where the filtering process may depend on samples in a different picture.

EXAMPLE 15

In one example, a video unit may be padded before and/or after the filtering process. In one example, the video unit may be padded at boundary positions by $N_{pad}$ (e.g., $N_{pad}=2$) samples.

EXAMPLE 16

In one example, whether to pad and/or how to pad the samples/pixels may depend on whether the neighboring samples/pixels have been decoded in a different slice, tile, brick and/or subpicture.

EXAMPLE 17

In one example, when the neighboring samples/pixels have been decoded, the neighboring samples/pixels may be padded using the decoded neighboring samples/pixels. In an example, when the neighboring samples/pixels have not been decoded, a pre-defined value may be used to pad.

EXAMPLE 18

In one example, extending and/or minoring padding may be used. In this case, the padding samples/pixels are from the current video unit and not from neighboring samples/pixels.

EXAMPLE 19

In one example, the boundary samples of the video unit may be padded by a mirroring function. For example, when boundary samples are [a, b, c], the padded samples may be [c, b, a, b, c] as shown below.

Figure 5:
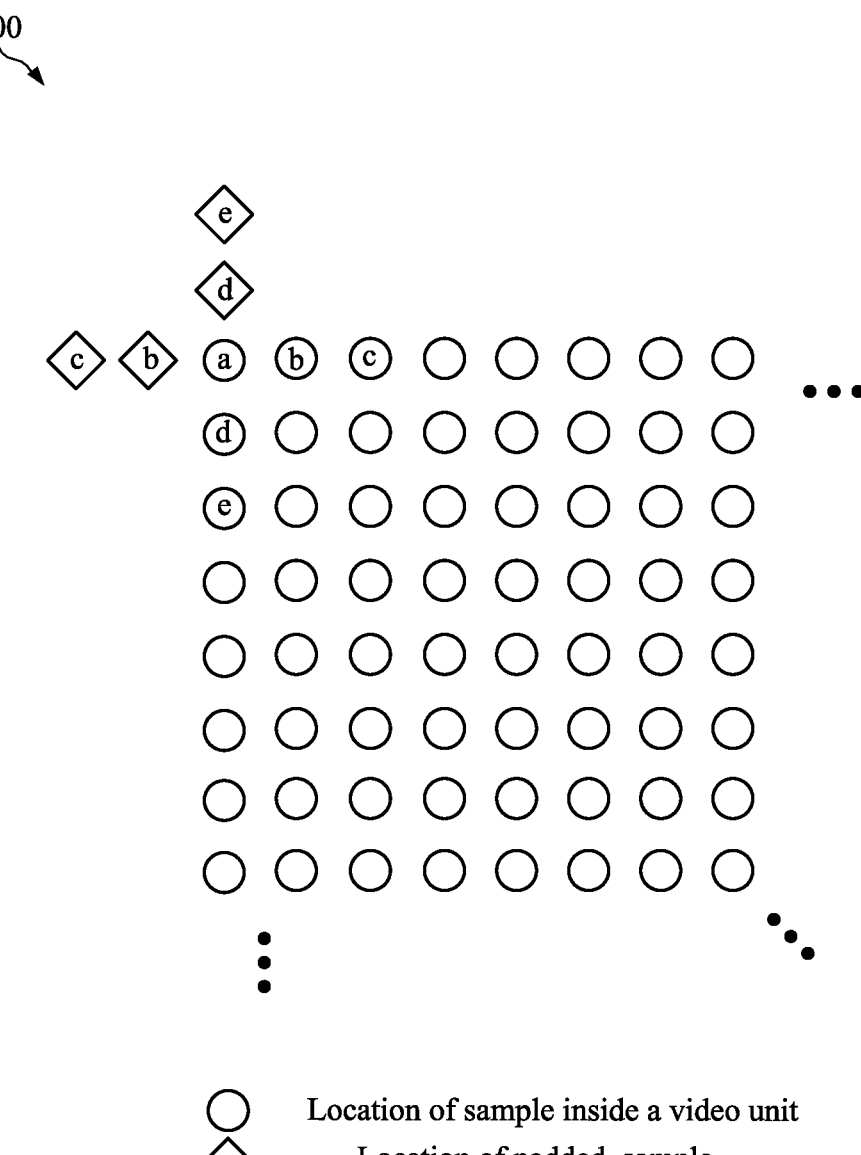
FIG. 5 is a schematic diagram of an example mechanism for mirror padding.

FIG. 5 is a schematic diagram 500 of an example mechanism for minor padding. In diagram 500, the circles depict samples inside a video unit and squares depict padded samples outside the video unit. As shown, the padded samples b, c, d, and e outside the video unit are generated based on the sample b, c, d, and e inside the video unit. Accordingly, the boundary samples of the video unit may be padded by a mirroring function as shown in diagram 500 in one example.

In one example, the boundary sample of the video unit may be padded by extending function. For example, when boundary samples are [a, b, c], the padded samples may be [b, c, a, b, c] as shown below.

Figure 6:
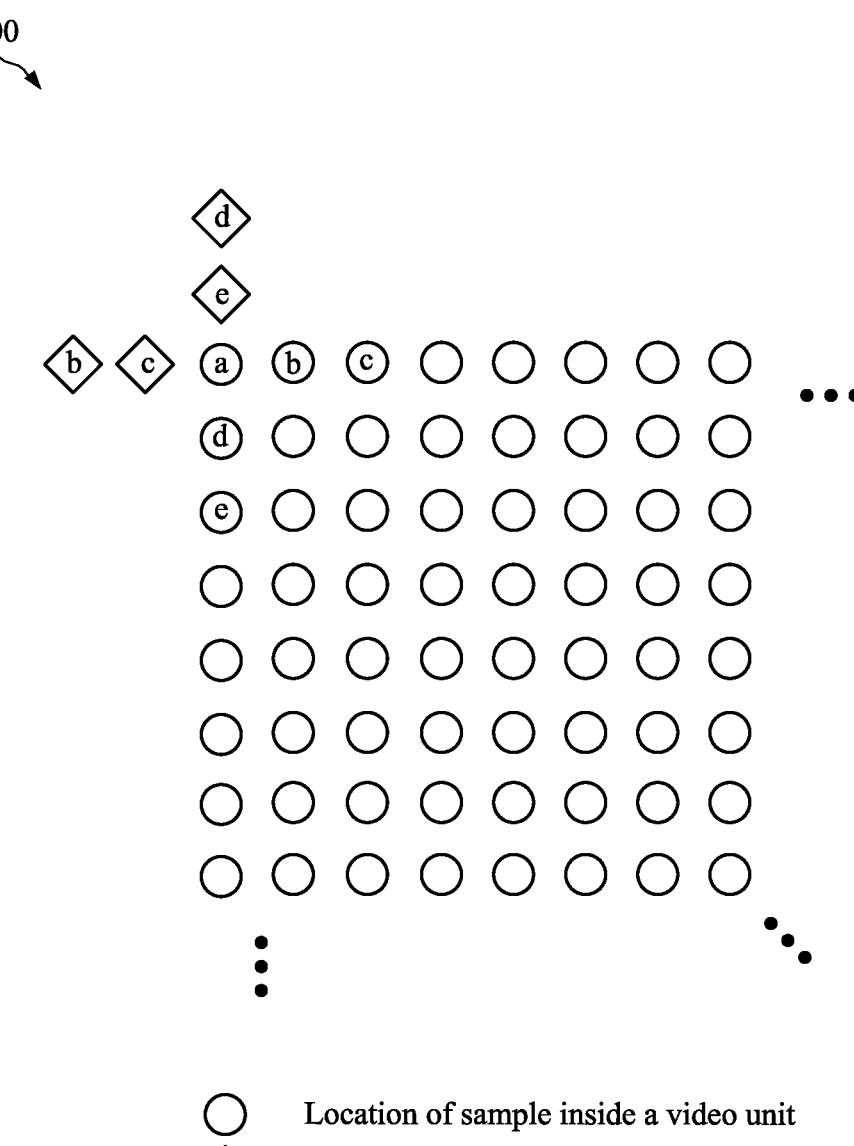
FIG. 6 is a schematic diagram of an example mechanism for extended padding.

FIG. 6 is a schematic diagram 600 of an example mechanism for extended padding. In diagram 600, the circles depict samples inside a video unit and squares depict padded samples outside the video unit. As shown the padded samples b, c, d, and e outside the video unit are generated based on the sample b, c, d, and e inside the video unit. The difference between diagram 500 and diagram 600 is that in diagram 500 samples are mirrored around sample a, while in diagram 600 the samples are copied from one side of sample a and included in the same order on the other side of sample a. Accordingly, the boundary sample of the video unit may be padded by an extending function in an example.

EXAMPLE 20

In an example, the padded samples may be used in the filtering process. Further, the samples filtered by the filtering process may be used to pad samples.

EXAMPLE 21

In one example, filtering in the BF may be performed at subblock-level.

EXAMPLE 22

In one example, the coded and/or statistical information may be shared by a subblock (e.g., 2×2/1×2/2×1). In an example, the filtered results of a first subblock may be used to filter samples of a second subblock. In an example, unfiltered samples of a first subblock may be used to filter samples of a second subblock.

EXAMPLE 23

In one example, the BF may be performed at different stages in the video codec coding flow. In one example, the BF may be used at the loop-filtering stage. In one example, the BR may be performed before or after the DF. In one example, the BF may be performed before or after the SAO filter. In one example, the BF may be performed before or after the ALF. In one example, the BF may be performed before or after other loop filters. In one example, the BF may be performed as a post-processing filter that filters the samples/pixels after the decoding is finished.

EXAMPLE 24

In one example, a first filtering stage (e.g., the BF) may be performed independently with respect to a second filtering process (e.g., SAO, ALF, BF or other loop filters). For example, the first and second filter may be applied on the same input samples, producing a first offset and a second offset. An output sample may be derived based on both the first and second offset. The output sample may be clipped. The output sample may be further processed by a next stage. In one example, the BF may be applied on the prediction samples before generating the reconstruction samples at decoder. In one example, the BF may be applied on the reconstructed samples of a coding block, which may be used to predict succeeding samples or blocks. In an example, the BF may be performed before or after a neural-network-based filter.

EXAMPLE 25

In one example, the video units or samples may be classified into multiple groups and one or more parameters associated with a group may be used. In one example, video units within a higher-level video region may be classified into $N_{unit}$ groups by the coded/statistical information (e.g., mean/variance/block dimensions) of the video units. In one example, the BF may have different parameters on video units of different classes. In one example, the coded and/or statistical information of the video unit may be used in video unit classification. In one example, the mean of the input block may be used in unit classification. For example, the unit mean value may be computed by:

$$S = w_{unit} \times h_{unit}$$

$$\text{mean}_{unit} = \left( \sum_{i=0}^{i=S-1} p_i \right) \Big/ S$$

where $p_i$ is the luma or chroma located at i position inside the video unit, $w_{unit}$ and $h_{unit}$ are width and height of the video unit respectively.

EXAMPLE 26

In one example, the variance of the video unit may be used in unit classification. The unit variance may be computed by:

$$\text{corr}_{unit} = \left( \sum_{i=0}^{i=S-1} p_i \times p_i \right) \Big/ S$$

$$\text{var}_{unit} = \text{corr}_{unit} - \text{mean}_{unit}^2$$

EXAMPLE 27

In one example, a fixed threshold value $T_{unit\_class}$ (e.g., $T_{unit\_class}=1024$) may be used to compute the class index of the video unit based on the unit variance. The unit mean value or other statistical information is as follows:

$$\text{index}_{unit} = \lfloor \text{info}_{unit} / T_{block\_class} \rfloor$$

where $0 \leq \text{index}_{unit} < N_{unit}$ and $\text{info}_{unit}$ are the corresponding statistical information.

EXAMPLE 28

In one example, a set of threshold value $[T_1, T_2, \ldots T_{N-1}]$ may be used to classify the video unit based on the unit variance, the unit mean value, or other statistical information as follows:

$$\text{index}_{unit} = 0 \text{ when } (0 \leq \text{info}_{unit} < T_1)$$
$$\ldots$$
$$\text{index}_{unit} = N_{unit} - 2 \text{ when } (T_{N-2} \leq \text{info}_{unit} < T_{N-1})$$
$$\text{index}_{unit} = N_{unit} - 1 \text{ when } (T_{N-1} \leq \text{info}_{unit})$$

where $0 \leq \text{index}_{unit} < N_{unit}$ and $\text{info}_{unit}$ stands for the corresponding statistical information.

EXAMPLE 29

In one example, the width or height of the video unit may be used in block classification individually. In one example, the width and height of the video unit may be used in block classification jointly.

EXAMPLE 30

In one example, the video unit may be a CTU, CTB, CU, CB and/or TB. In one example, the higher-level video region may be a slice, subpicture, tile, brick, picture, and/or sequence. In one example, the samples inside the video unit may be classified into $N_{sample}$ groups. In one example, the BF may have different parameters on samples of different classes in a video unit. In one example, the coded/statistical information within a window may be used in a sample/pixel classification. In one example, the coded/statistical information used in the sample classification may be the mean value within a window. In one example, the coded/statistical information used in the sample classification may be the variance within a window. In one example, the coded/statistical information used in the sample classification may be the gradient information within a window. In one example, the gradient information may be the minimum of the gradient within a window. In one example, the gradient information may be the maximum of the gradient within a window. In one example, the gradient information may be the mean of the gradient within a window. In one example, the window shape may be a square. In one example, the window shape may be a diamond. In one example, the window shape may be a cross. In one example, the window shape may be symmetrical. In one example, the window shape may be asymmetrical. In one example, the video unit may be a CTU, CTB, CU, CB and/or TB.

EXAMPLE 31

In one example, whether to apply and/or how to apply the BF for a video unit or a sample/pixel within a video unit may depend on the coded information or determined on-the-fly. In one example, the coded information may refer to the transform coefficients in the video unit. In one example, the BF may be applied when the video unit has one or more transform coefficient levels not equal to 0, such as when the coded block flag (CBF) of the current video unit is equal to 1. In one example, the BF may be disallowed when the video unit has all zero transform coefficient levels, such as when the CBF of the current video unit is equal to 0. In one example, the coded information may refer to the color component and/or color format of the video unit. In one example, the BF may be applied when the component of current video unit is Cb and/or Cr in YCbCr format. In one example, the BF may be applied when the component of current video unit is G, B, and/or R in RGB format. In one example, the coded information may refer to QP. In one example, the BF may be applied when the QP of current video unit is larger than $T_{QP}$ (e.g., $T_{QP}$=17).

EXAMPLE 32

In one example, the coded information may refer to the dimension and/or size of the video unit. In one example, the BF may be applied when the min of width and height of current video unit is smaller or larger than $T_{size\_min}$ (e.g., $T_{size\_min}$=16). In one example, the BF may be applied when the max of the width and height of current video unit is smaller or larger than $T_{size\_max}$ (e.g., $T_{size\_max}$=64). In one example, the BF may be applied when both the width and height of the current video unit are smaller or larger than $T_{size\_both}$ (e.g., $T_{size\_both}$=8). In one example, the coded information may refer to the number of samples/pixels in the video unit. In one example, the BF may be applied when the number of samples inside the video unit multiplied by a factor $F_{num}$ (e.g., $F_{num}$=1, 2 or 4) is larger than or less than or equal to $T_{num}$ (e.g., $T_{num}$=16). In one example, the coded information may refer to any coding mode or information such as inter prediction mode, intra prediction mode, merge flag, merge index, affine flag, motion vector, reference index, etc. In one example, for two samples/pixels in a video unit, one of them may be filtered by the BF and the other is not.

EXAMPLE 33

In one example, whether to use and/or how to use the BF for a video unit may be signaled to the decoder using one or more syntax elements. In one example, one or more syntax elements may be signaled at VPS, SPS, PPS, picture, sub-picture, slice, tile, slice group, tile group, CTU, CU, PU, TU, CTB, CB, PB, TB, and/or other levels. In one example, a slice level syntax element may be signaled to the decoder side. The slice level syntax element may be determined by the RDO operation. In an example, the slice level syntax element may decide whether the in-loop filter is applied for the video blocks inside the slice.

EXAMPLE 34

In one example, a CTU level syntax element may be signaled to the decoder side. The CTU level syntax element may be determined by the RDO operation. The CTU level syntax element may decide whether the in-loop filter is applied for the video blocks inside the CTU. In one example, a CU level syntax element may be signaled to the decoder side. In one example, the CU level syntax element may be determined by the RDO operation. In one example, the CU level syntax element may be set to false at the CU initial process. In one example, the CU level syntax element may not be signaled at the encoder side and may be set to false at the decoder side when the channel type of current CU is not equal to luma. In one example, the CU level syntax element may not be signaled at the encoder side and may be set to false at the decoder side when the QP of current CU is smaller than a threshold value $T_{CUQP}$ (e.g., $T_{CUQP}$=17). In one example, the CU level syntax element may not be signaled at the encoder side and may be set to false at the decoder side when the max of the width and height of current CU is not smaller than a threshold value $T_{CUmax}$ (e.g., $T_{CUmax}$=64). In one example, the CU level syntax element may not be signaled at the encoder side and may be set to false at the decoder side when the min of the width and height of current CU is not smaller than a threshold value $T_{CUmin}$ (e.g., $T_{CUmin}$=16). In one example, the CU level syntax element may not be signaled at the encoder side and may be set to false at the decoder side when both of the width and height of current CU is not smaller or not larger than a threshold value $T_{CUboth}$ (e.g., $T_{CUboth}$=8).

EXAMPLE 35

In one example, a TU level syntax element may be signaled to the decoder side. In one example, the TU level syntax element may be determined by the RDO operation. In one example, the TU level syntax element may be set to false at TU initial process. In one example, the TU level syntax element may not be signaled at the encoder side and may be set to false at the decoder side when the channel type of current TU is not equal to luma. In one example, the TU level syntax element may not be signaled at the encoder side and may be set to false at the decoder side when the QP of current TU is smaller than a threshold value $T_{TUQP}$ (e.g., $T_{TUQP}$=17). In one example, the TU level syntax element may not be signaled at the encoder side and may be set to false at the decoder side when the CBF of current TU is equal to false. In one example, the TU level syntax element may not be signaled at the encoder side and may be set to false at the decoder side when the max of the width and height of current TU is not smaller than a threshold value $T_{TUmax}$ (e.g., $T_{TUmax}$=64). In one example, the TU level syntax element may not be signaled at the encoder side and may be set to false at the decoder side when the min of the width and height of current TU is not smaller than a threshold value $T_{TUmin}$ (e.g., $T_{TUmin}$=16). In one example, the TU level syntax element may not be signaled at the encoder side and may be set to false at the decoder side when both of the width and height of current TU is not smaller or not larger than a threshold value $T_{TUboth}$ (e.g., $T_{TUboth}$=8) In one example, the syntax elements may be coded by a bypass-based method. In one example, the syntax elements may be coded by a context-based method.

EXAMPLE 36

In an example, the syntax elements for indications of BF usage on chroma components may be conditionally signaled. In one example, the above syntax elements may be signaled only when luma SAO is enabled. In one example, the above syntax elements may be signaled only when luma BF is enabled. In one example, the above syntax elements may be signaled only when certain decoded information is satisfied (e.g., CBF is equal to 1).

EXAMPLE 37

In an example, the video unit may refer to a sequence, a picture, a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), and/or any other region that contains more than one luma or chroma sample/pixel.

EXAMPLE 38

In one example, whether to and/or how to apply the disclosed methods above may be signaled at sequence level, group of pictures level, picture level, slice level, and/or tile group level, such as in sequence header, picture header, SPS, VPS, DPS, decoding capability information (DCI), PPS, adaptation parameter set (APS), slice header, and/or tile group header.

EXAMPLE 39

In one example, whether to and/or how to apply the disclosed methods above may be signaled at PB, TB, CB, PU, TU, CU, virtual pipeline data unit (VPDU), CTU, CTU row, slice, tile, sub-picture, or other regions containing more than one sample or pixel.

EXAMPLE 40

In one example, whether to and/or how to apply the disclosed methods above may be dependent on coded information, such as block size, color format, single/dual tree partitioning, color component, slice/picture type.

An example implementation is now discussed. In the following exemplary embodiment, the BF may be performed on chroma components and in parallel with the SAO filter. The BF can be performed as part of the SAO loop-filter stage. Both the BF and SAO use samples produced by the deblocking filter as input. Each of these two filters generates an offset for each sample. The two offsets are added to the input sample and then clipped before proceeding to the ALF.

In an example, the output sample $I_{OUT}$ could be computed as:

$$I_{OUT}=\text{clip3}(I_C+\Delta I_{BF}+\Delta I_{SAO})$$

where $I_C$ is the input sample from the deblocking filter, $\Delta I_{BIF}$ is the offset from the bilateral filter, $\Delta I_{SAO}$ is the offset from SAO, and clip3 is a clipping function. The BF may allow the encoder to enable or disable filtering at the CTU and slice level. The encoder makes the decision by evaluating the RDO cost.

The following syntax elements are introduced in the PPS. An example, PPS RBSP syntax is as follows.

| | Descriptor |
| --- | --- |
| pic_parameter_set_rbsp( ) { | |
| ... | |
|    pps_chroma_bilateral_filter_enabled_flag | u(1) |
|    if( pps_chroma_bilateral_filter_enabled_flag) { | |
|       chroma_bilateral_filter_strength | u(2) |
|       chroma_bilateral_filter_qp_offset | se(v) |
|    } | |

A pps_chroma_bilateral_filter_enabled_flag equal to 0 specifies that the BF is disabled for slices referring to the PPS. A pps_chroma_bilateral_filter_flag equal to 1 specifies that the BF is enabled for slices referring to the PPS. A chroma bilateral_filter_strength specifies a BF strength value used in the bilateral transform block filter process. The value of chroma_bilateral_filter_strength shall be in the range of 0 to 2, inclusive. A chroma bilateral_filter_qp_off-set specifies an offset used in the derivation of the bilateral filter look-up table, LUT(x), for slices referring to the PPS.

The following syntax elements are introduced. An example general slice header syntax is as follows.

| | Descriptor |
| --- | --- |
| slice_header( ) { | |
| ... | |
|   if( pps_chroma_bilateral_filter_enabled_flag ) { | |
|     slice_chroma_bilateral_filter_all_ctb_enabled_flag | u(1) |
|     if( | |
|     !slice_chroma_bilateral_filter_all_ctb_enabled_flag ) | |
|       slice_chroma_bilateral_filter_enabled_flag | u(1) |
|   } | |

An example coding tree unit syntax is as follows.

| | Descriptor |
|---|---|
| coding_tree_unit( ) { | |
| ... | |
|   if( !slice_chroma_bilateral_filter_all_ctb_enabled_flag && slice_chroma_bilateral_filter_enabled_flag ) | |
|     chroma_bilateral_filter_ctb_flag[ xCtb >> CtbLog2SizeY ][ yCtb >> CtbLog2SizeY ] | u(1) |

The semantics are as follows. A slice_chroma_bilateral_filter_all_ctb_enabled_flag equal to 1 specifies that the BF is enabled and is applied to all CTBs in the current slice. When slice_chroma_bilateral_filter_all_ctb_enabled_flag is not present, it is inferred to be equal to 0. A slice_chroma_bilateral_filter_enabled_flag equal to 1 specifies that the BF is enabled and may be applied to CTBs of the current slice. When slice_chroma_bilateral_filter_enabled_flag is not present, it is inferred to be equal to slice_chroma_bilateral_filter_all_ctb_enabled_flag. A chroma_bilateral_filter_ctb_flag[xCtb>>CtbLog2SizeY] [yCtb>>CtbLog2SizeY] equal to 1 specifies that the BF is applied to the chroma coding tree block of the coding tree unit at luma location (xCtb, yCtb).

For CTUs that are filtered, the filtering process may proceed as follows. At the picture border, where samples are unavailable, the bilateral filter uses extension (e.g., sample padding) to fill in unavailable samples. For virtual boundaries, the behavior is similar to the SAO, (e.g., no filtering occurs). When crossing horizontal CTU borders, the BF may access the same samples being accessed by the SAO.

Figure 7:
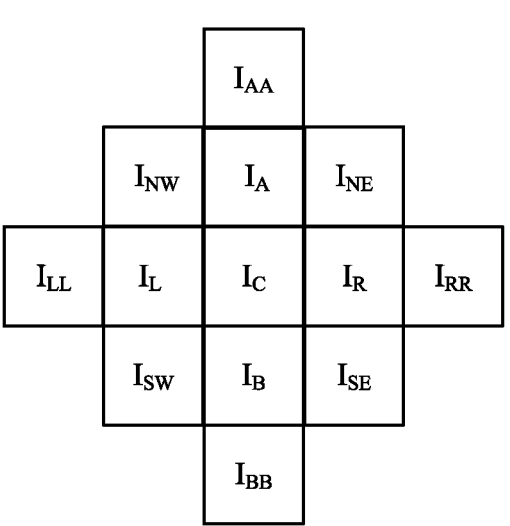
FIG. 7 is a schematic diagram of an example filtering pattern for a bilateral filter.

FIG. 7 is a schematic diagram 700 of an example filtering pattern for a bilateral filter. The samples surrounding the center sample $I_C$ are denoted according to schematic diagram 700, where A, B, L, R NW, NE, SW, SE, AA, and BB stand for above sample, below sample, left sample, right sample, north-west sample, north-east sample, south-west sample, south-east sample, above-above sample, and below-below sample, respectively. Accordingly, schematic diagram 700 illustrates a naming convention for samples surrounding the center sample.

Each surrounding samples $I_A$, $I_R$, etc. each contribute a corresponding modifier value $\mu_{\Delta I_A}$, $\mu_{\Delta I_R}$, etc. These modifiers are calculated in the following way. Starting with the contribution from the sample to the right, $I_R$, the difference is calculated as follows:

$$\Delta I_R = (|I_R - I_C| + 4) >> 3$$

where $||$ denotes an absolute value. For data that is not 10 bits, the following can be used instead $\Delta I_R = (|I_R - I_C| + 2^{n-6}) >> (n-7)$, where n=8 for 8-bit data, etc. The resulting value is now clipped as follows so that the value is smaller than 16:

$$sI_R = \min(15, \Delta I_R)$$

The modifier value is then calculated as:

$$\mu_{\Delta I_R} = \begin{cases} LUT_{ROW}[sI_R], & \text{if } I_R - I_C \geq 0, \\ -LUT_{ROW}[sI_R] & \text{otherwise} \end{cases}$$

where $LUT_{ROW}[]$ is an array of 16 values determined by the value of qpb=clip (0, 25, QP+chroma_bilateral_filter_qp_offset-17) and QP is a quantization parameter.

The modifier values for $\mu_{\Delta I_L}$, $\mu_{\Delta I_A}$ and $\mu_{\Delta I_B}$ are calculated from $I_L$, $I_A$ and $I_B$ in the same way. For diagonal samples $I_{NW}$, $I_{NE}$, $I_{SE}$, $I_{SW}$, and the samples two steps away $I_{AA}$, $I_{BB}$, $I_{RR}$ and $I_{LL}$, the calculation also follows the above equations, but uses a value shifted by 1. For example, the diagonal sample $I_{SE}$ is calculated as follows:

$$\mu_{\Delta I_{SE}} = \begin{cases} LUT_{ROW}[sI_{SE}] >> 1, & \text{if } I_{SE} - I_C \geq 0, \\ -(LUT_{ROW}[sI_{SE}] >> 1) & \text{otherwise} \end{cases}$$

The other diagonal samples and two-steps-away samples are calculated in a similar manner. The modifier values are summed together according to:

$$m_{sum} = \mu_{\Delta I_A} + \mu_{\Delta I_B} + \mu_{\Delta I_L} + \mu_{\Delta I_R} + \mu_{\Delta I_{NW}} + \mu_{\Delta I_{NE}} + \mu_{\Delta I_{SW}} + \mu_{\Delta I_{SE}} + \mu_{\Delta I_{AA}} + \mu_{\Delta I_{BB}} + \mu_{\Delta I_{LL}} + \mu_{\Delta I_{RR}}$$

The $m_{sum}$ value is then multiplied by c=1, 2, or 3, which can be done using a single adder and logical AND gates in the following way:

$$c_v = k_1 \& (m_{sum} << 1) + k_2 \& m_{sum}$$

where & denotes logical AND, $k_1$ is the most significant bit of the multiplier c, and $k_2$ is the least significant bit. c is obtained using the mode and the size of the block.

Finally, the chroma bilateral filter offset $\Delta I_{BIF}$ may be calculated. The following is used for full strength filtering:

$$\Delta I_{BIF} = (c_v + 16) >> 5$$

A general formula for n-bit data is:

$$r_{add} = 2^{14-n-chroma\_bilateral\_filter\_strength}$$

$$r_{shift} = 15 - n - chroma\_bilateal\_filter\_strength$$

$$\Delta I_{BIF} = (c_v + r_{add}) >> r_{shift},$$

where chroma_bilateral_filter_strength can be 0 or 1 and is signalled in the PPS.

Figure 8:
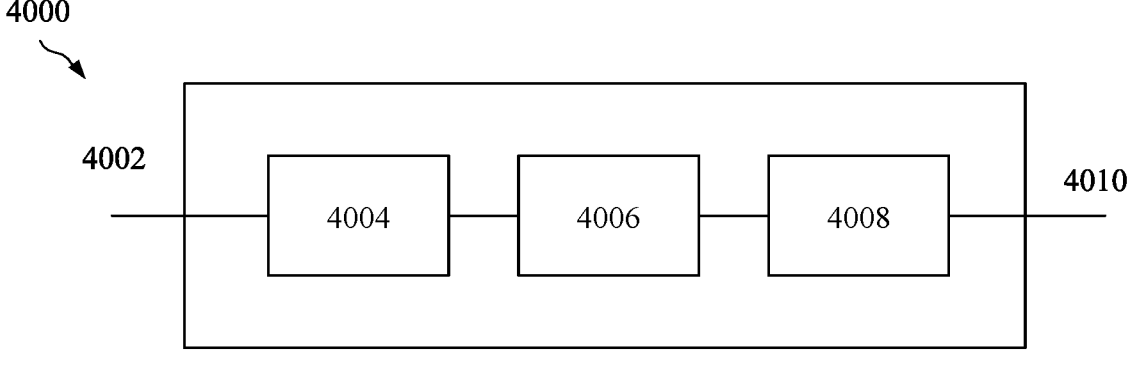
FIG. 8 is a block diagram showing an example video processing system.

FIG. 8 is a block diagram showing an example video processing system 4000 in which various embodiments disclosed herein may be implemented. Various implementations may include some or all of the components of the system 4000. The system 4000 may include input 4002 for receiving video content. The video content may be received in a raw or uncompressed format, e.g., 8- or 10-bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 9:
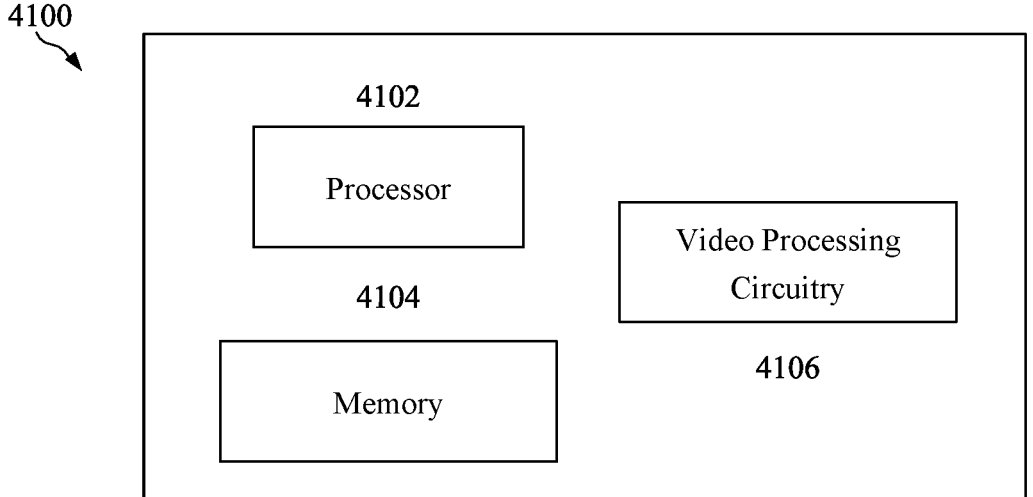
FIG. 9 is a block diagram of an example video processing apparatus.

FIG. 9 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and embodiments described herein. The video processing circuitry 4106 may be used to implement, in hardware circuitry, some embodiments described in the present disclosure. In some embodiments, the video processing circuitry 4106 may be at least partly included in the processor 4102, e.g., a graphics co-processor.

FIG. 10 is a flowchart for an example method 4200 of video processing. The method 4200 includes determining to apply a bilateral filter to samples in a current block of a current picture at step 4202. The bilateral filter includes filter weights that vary based on a distance between surrounding samples and a central sample and differences in intensities of the surrounding samples and the central sample. In an example, the bilateral filter is applied according to:

$$I_{filtered} = I_C + e \times \left[ \sum_{i=0}^{i=n} \mu(\Delta_i, \Omega_i) \right]$$

where $I_{filtered}$ is an updated sample value, $I_C$ is the central sample located at a center of a filter shape, e is a strength factor, $\mu(\Delta_i, \Omega_i)$ is a function for determining a filtered weight of each surrounding sample at a position in the filter shape, $\Delta_i$ is a difference between an ith surrounding sample and the central sample, $\Omega_i$ is a sum of vertical and horizontal distance between the ith surrounding sample and the central sample, and n is a total number of samples in the filter shape. In an example, the $\mu(\Delta_i, \Omega_i)$ is formulated for each ith sample as follows:

$$\mu(\Delta, \Omega) = \left( e^{-\frac{\Delta^2}{2\sigma_r^2}} \times \Delta \right) \times \frac{e^{-\frac{(\Omega-1)}{2\sigma_d^2}}}{1 + 4e^{-\frac{1}{2\sigma_d^2}}}$$

where $\sigma_d$ and $\sigma_r$ are filtering parameters, $\Delta$ is a difference between each ith surrounding sample and the central sample, and $\Omega$ is a sum of vertical and horizontal distance between each ith surrounding sample and the central sample.

In an example, $\sigma_d$ and $\sigma_r$ are set based on coding mode, size, or coded information related to the current block. In an example, e is set based on a width and a height of the current block. In an example, e is set based on a maximum size of the current block in luma samples, denoted as max(width$_{luma}$, height$_{luma}$), a minimum size of the current block in luma samples, denoted as min(width$_{luma}$, height$_{luma}$), a maximum size of the current block in chroma samples, denoted as max(width$_{chroma}$, height$_{chroma}$), a minimum size of the current block in chroma samples, denoted as min(width$_{chroma}$, height$_{chroma}$), or combinations thereof.

In an example, the bilateral filter operates based on offsets, and wherein an offset for chroma samples is generated based on an offset for luma samples. In an example, an offset for chroma samples is generated based on local information related to luma samples. In an example, the bilateral filter is applied according to a look-up table. In an example, the bilateral filter includes bit shifting operations. In an example, the bilateral filter includes a first operation for luma components and a second operation for chroma components. Further, the first operation and the second operation are different. In an example, the bilateral filter is applied to reconstructed samples. In an example, operation of the bilateral filter is based on coded information related to the current block. In an example, the coded information includes a coding mode, a motion information, a dimension of the current block, a QP, sample values, variables related to the sample values, or combinations thereof. In an example, the bilateral filter employs coded information related to a luma component to filter a chroma component.

In an example, the bilateral filter employs mean, variance, block dimensions, or combinations thereof, to generate filtered luma samples or filtered chroma samples. In an example, the bilateral filter employs a square shape, a cross shape, a diamond shape, a symmetrical shape, an asymmetrical shape, or combinations thereof. In an example, the bilateral filter employs luma sample information when filtering chroma samples. In an example, the bitstream further comprises a reference picture containing a reference block including reference samples. Further, the bilateral filter is applied to the samples of the current block based on the reference samples in the reference block.

In an example, padding is applied to the current block according to a mirroring function or an extending function. In an example, the padding uses neighboring samples from a neighboring video unit when the neighboring samples have been decoded prior to the samples. In an example, the bilateral filter accepts padded samples as input. In an example, samples filtered by the bilateral filter are used to as padding.

At step 4204, a conversion is performed between a visual media data and a bitstream based on the bilateral filter. When the method 4200 is performed on an encoder, the conversion comprises encoding the visual media data into the bitstream. For example, the conversion includes encoding video units into the bitstream. The video units encoded into the bitstream are then reconstructed for use as reference video units for encoding of subsequent video units. When the method 4200 is performed on a decoder, the conversion comprises parsing and decoding the bitstream to obtain the video units in the visual media data. In either case, a bilateral filter is applied to samples in the video units at step 4204.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 11:
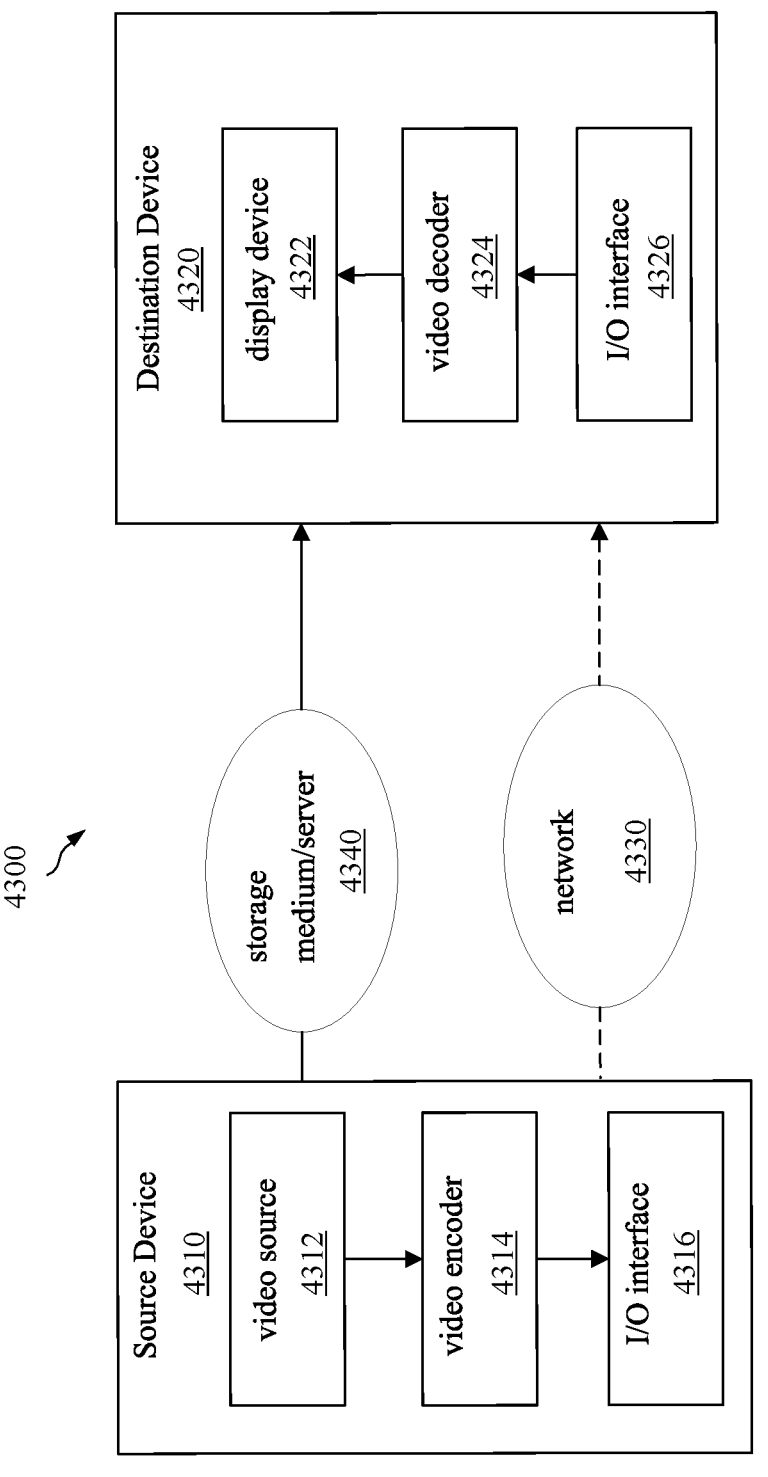
FIG. 11 is a block diagram that illustrates an example video coding system.

FIG. 11 is a block diagram that illustrates an example video coding system 4300 that may utilize the embodiments of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/ server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the HEVC standard, the VVC standard, and other current and/or further standards.

Figure 12:
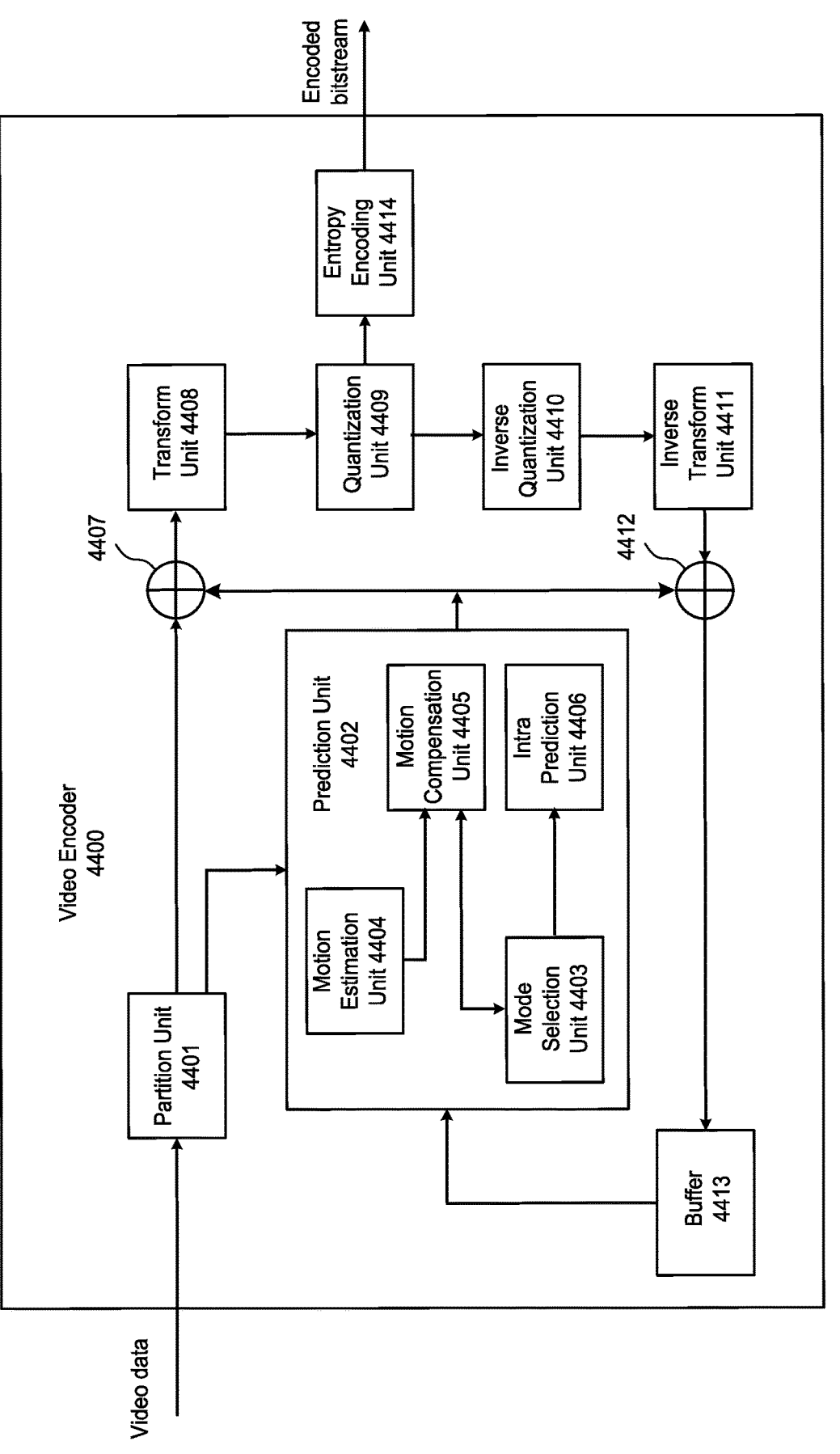
FIG. 12 is a block diagram that illustrates an example encoder.

FIG. 12 is a block diagram illustrating an example of video encoder 4400, which may be video encoder 4314 in the system 4300 illustrated in FIG. 11. Video encoder 4400 may be configured to perform any or all of the embodiments of this disclosure. The video encoder 4400 includes a plurality of functional components. The embodiments described in this disclosure may be shared among the various components of video encoder 4400. In some examples, a processor may be configured to perform any or all of the embodiments described in this disclosure.

The functional components of video encoder 4400 may include a partition unit 4401; a prediction unit 4402, which may include a mode select unit 4403, a motion estimation unit 4404, a motion compensation unit 4405, and an intra prediction unit 4406; a residual generation unit 4407; a transform processing unit 4408; a quantization unit 4409; an inverse quantization unit 4410; an inverse transform unit 4411; a reconstruction unit 4412; a buffer 4413; and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 13:
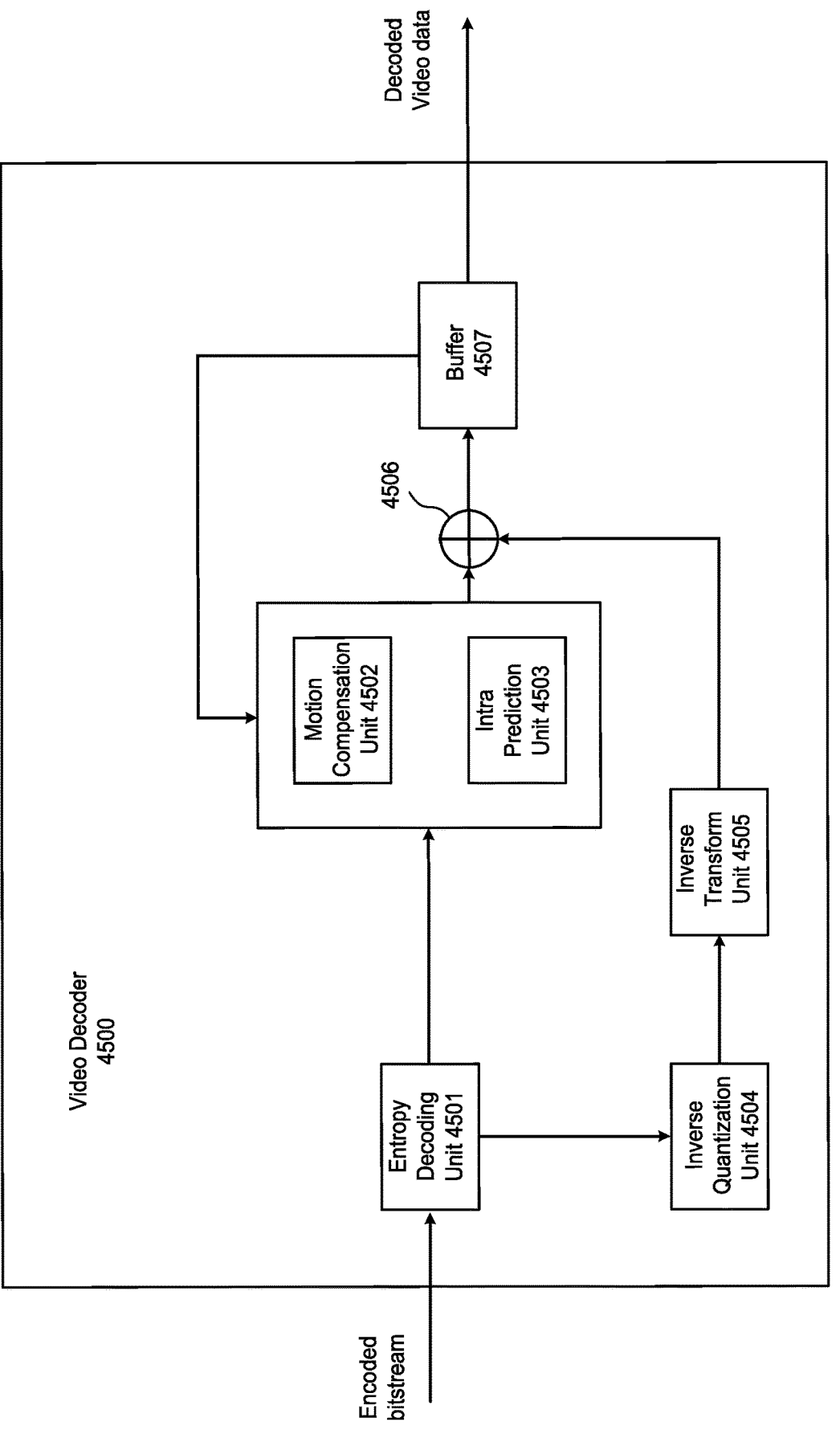
FIG. 13 is a block diagram that illustrates an example decoder.

FIG. 13 is a block diagram illustrating an example of video decoder 4500 which may be video decoder 4324 in the system 4300 illustrated in FIG. 11. The video decoder 4500 may be configured to perform any or all of the embodiments of this disclosure. In the example shown, the video decoder 4500 includes a plurality of functional components. The embodiments described in this disclosure may be shared among the various components of the video decoder 4500. In some examples, a processor may be configured to perform any or all of the embodiments described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

FIG. 14 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of embodiments discussed herein.

1. A method of media data processing (e.g., method 4200 depicted in FIG. 10), comprising making a determination to apply a bilateral filter to a chroma video block of a video according to a rule; and performing a conversion between the video and a bitstream of the video according to the determination.

2. The method of solution 1, wherein the rule specifies that the bilateral filter depends on a chroma type of the chroma video block.

3. The method of any of solutions 1-2, wherein the bilateral filter is applied for a modification of reconstructed chroma pixel values.

4. The method of solution 3, wherein the modification is dependent on a coded information of the chroma video block and/or a filter shape of the bilateral filter.

5. The method of any of above solutions, wherein the rule specifies to use luma sample values of the video in application of the bilateral filter.

6. The method of any of above solutions, wherein the rule specifies that the bilateral filter is applied using sample values from a different picture that is different from a picture containing the chroma video block.

7. The method of any of above solutions, wherein the rule specifies padding the chroma video block.

8. The method of solution 7, wherein the padding is performed prior to applying the bilinear filter.

9. The method of solution 7, wherein the padding is performed after applying the bilinear filter.

10. The method of solutions 7-9, wherein the padding comprises a mirroring padding.

11. The method of solutions 7-9, wherein the padding comprises an extending padding.

15. The method of any of above solutions, wherein the bilateral filter is applied as an in-loop filter.

16. The method of any of above solutions, wherein the bilateral filter is applied as a post-processing filter.

17. The method of any of solutions 1-16, wherein the conversion includes generating the bitstream from the video.

18. The method of any of solutions 1-17, wherein the conversion includes generating the video from the bitstream.

19. A video decoding apparatus comprising a processor configured to implement a method recited in one or more of solutions 1 to 18.

21. A computer program product having computer code stored thereon, the code, when executed by a processor, causes the processor to implement a method recited in any of solutions 1 to 18.

22. A method of video processing comprising generating a bitstream according to a method recited in any one or more of solutions 1-17 and storing the bitstream on a computer readable medium.

23. A method, an apparatus or a system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:
determining, during a conversion between a current block in a current picture of a video and a bitstream, to apply a bilateral filter to samples in the current block, wherein the bilateral filter includes filter weights that vary based on a distance between surrounding samples and a central sample and differences in intensities of the surrounding samples and the central sample; and
performing the conversion based on the bilateral filter,
wherein the bilateral filter includes a first operation for luma components and a second operation for two chroma components, wherein the first operation and the second operation are different, and wherein the two chroma components share the same second operation.

2. The method of claim 1, wherein the bilateral filter is applied according to:

$$I_{filtered} = I_C + e \times \left[ \sum_{i=0}^{i=n} \mu(\Delta_i, \Omega_i) \right]$$

where $I_{filtered}$ is an updated sample value, $I_c$ is the central sample located at a center of a filter shape, e is a strength factor, is a function for determining a filtered weight of each surrounding sample at a position in the filter shape, $\Delta_i$ is a difference between an ith surrounding sample and the central sample, $\Omega_i$ is a sum of vertical and horizontal distance between the ith surrounding sample and the central sample, and n is a total number of samples in the filter shape, and wherein $\mu(\Delta_i, \Omega_i)$ is formulated for each ith sample as follows:

$$\mu(\Delta, \Omega) = \left( e^{-\frac{\Delta^2}{2\sigma_r^2}} \times \Delta \right) \times \frac{e^{-\frac{(\Omega-1)}{2\sigma_d^2}}}{1 + 4e^{-\frac{1}{2\sigma_d^2}}}$$

where $\sigma_d$ and $\sigma_r$ are filtering parameters, $\Delta$ is a difference between each ith surrounding sample and the central sample, and $\Omega$ is a sum of vertical and horizontal distance between each ith surrounding sample and the central sample.

3. The method of claim 2, wherein the bilateral filter is applied according to a look-up table, and the function $\mu(\Delta, \Omega)$ is baked into the look-up table.

4. The method of claim 1, wherein different parameters or different look-up tables are used for different samples or different positions in the current block.

5. The method of claim 1, wherein e is set based on a width and a height of a luma size of the current block, or wherein e is set based on a width and a height of a chroma size of the current block.

6. The method of claim 1, wherein the bilateral filter includes bit shifting operations including applying at least one of left-shifting and right-shifting operations on variables before or after or during applying the bilateral filter in order to keep a calculation precision.

7. The method of claim 1, wherein the bilateral filter is applied to reconstructed samples.

8. The method of claim 1, wherein the operations of the bilateral filter are based on coded information related to the current block, and wherein the coded information includes a coding mode, a motion information, a dimension of the current block, a quantization parameter (QP), or combinations thereof.

9. The method of claim 8, wherein the bilateral filter employs the coded information related to a luma component of the current block to filter a chroma component of the current block.

10. The method of claim 8, wherein the coded information is generated from luma samples in the current block.

11. The method of claim 8, wherein the coded information is generated from chroma samples in the current block.

12. The method of claim 1, wherein the bilateral filter employs a diamond shape.

13. The method of claim 1, wherein a padding operation is applied to the current block, when the current block is at boundary positions by N samples, wherein N is an integer, and wherein the bilateral filter accepts padded samples as input when the padding operation is applied before the bilateral filter is applied, and samples filtered by the bilateral filter are used as padding when the padding operation is applied after the bilateral filter is applied.

14. The method of claim 13, wherein the applying of the padding operation depends on whether neighboring samples of the current block have been decoded in a different video region, wherein the video region is one of: a slice, a tile, a brick or a subpicture, and wherein the padding operation uses the neighboring samples from a neighboring video region when the neighboring samples have been decoded.

15. The method of claim 13, wherein the padding operation is applied according to a mirroring function or an extending function.

16. The method of claim 1, wherein the conversion includes encoding the video data into the bitstream.

17. The method of claim 1, wherein the conversion includes decoding the video data from the bitstream.

18. An apparatus for processing video data comprising:
a processor; and
a non-transitory memory with instructions thereon,
wherein the instructions upon execution by the processor, cause the processor to:
determine, during a conversion between a current block in a current picture of a video and a bitstream, to apply a bilateral filter to samples in the current block, wherein the bilateral filter includes filter weights that vary based on a distance between surrounding samples and a central sample and differences in intensities of the surrounding samples and the central sample; and perform the conversion based on the bilateral filter, wherein the bilateral filter includes a first operation for luma components and a second operation for two chroma components, wherein the first operation and the second operation are different, and wherein the two chroma components share the same second operation.

19. A non-transitory computer-readable recording medium storing a bitstream of a video which is generated by a method performed by a video processing apparatus, wherein the method comprises:

determining, for a current block in a current picture of a video, to apply a bilateral filter to samples in the current block, wherein the bilateral filter includes filter weights that vary based on a distance between surrounding samples and a central sample and differences in intensities of the surrounding samples and the central sample; and generating the bitstream based on the bilateral filter, wherein the bilateral filter includes a first operation for luma components and a second operation for two chroma components, wherein the first operation and the second operation are different, and wherein the two chroma components share the same second operation.

\* \* \* \* \*